United States Patent [19]

Weinberg

[11] Patent Number: 5,041,833
[45] Date of Patent: Aug. 20, 1991

[54] PRECISE SATELLITE RANGING AND TIMING SYSTEM USING PSEUDO-NOISE BANDWIDTH SYNTHESIS

[75] Inventor: Aaron Weinberg, Potomac, Md.

[73] Assignee: Stanford Telecommunications, Inc., Santa Clara, Calif.

[21] Appl. No.: 534,328

[22] Filed: Jun. 4, 1990

Related U.S. Application Data

[63] Continuation of Ser. No. 174,400, Mar. 28, 1988, abandoned.

[51] Int. Cl.$^5$ .................... H04B 7/185; G01S 5/02
[52] U.S. Cl. .................................................. 342/357
[58] Field of Search ............... 342/352, 356, 357, 457, 342/458; 364/459

[56] References Cited

U.S. PATENT DOCUMENTS 4,445,118  4/1984  Taylor et al. .................. 342/357
4,751,512  6/1988  Longaker ....................... 342/357

OTHER PUBLICATIONS

Ziemer, Digital Communications and Spread Spectrum Systems, 1985, Macmillan Publ. Co., pp. 348–355.

Primary Examiner—Theodore M. Blum
Attorney, Agent, or Firm—Jim Zegeer

[57] ABSTRACT

A precise ranging and timing system using pseudo-noise bandwidth synthesis to provide precise orbit determination for geosynchronous and low earth orbit satellites, navigation of low earth orbiting satellite through signals transmitted through geosynchronous satellites and precise time-transfer. The system includes a novel signal structure which is comprised of disjoint, narrow band, spectral components spread over a wide bandwidth. The number of spectral components, their individual bandwidths, and their specific spectral locations over the end-to-end spread bandwidth determine the ultimate capabilities and performance achievable. The broad beam transmission of the precise ranging and timing system signal via a geosynchronous satellite provide the precise ranging and timing system capability to suitably equipped users for a multiplicity of purposes including: (1) precise orbit determination, (2) navigation of low-earth orbiting satellites through signals transmitted through geosynchronous satellites, and (3) precise time transfer.

5 Claims, 17 Drawing Sheets

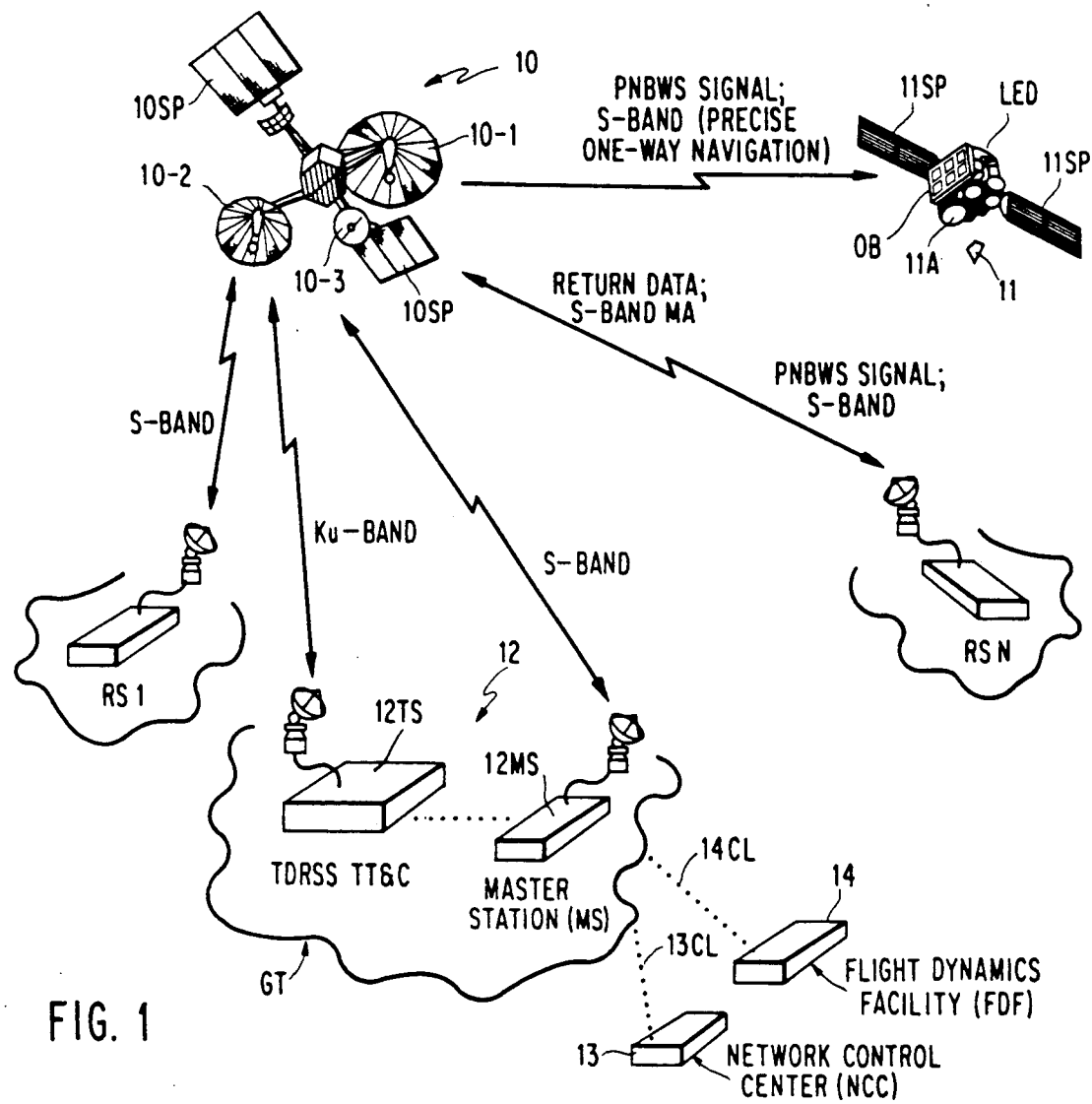
FIG. 1
FIG. 2A
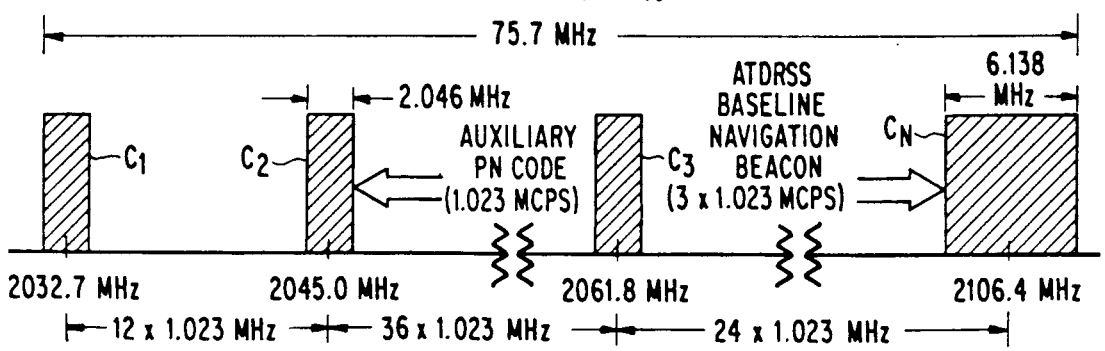

- $S(t) = A_0 d(T) P_0(t) \cos\omega_0 t + \sum_{i=1}^{N-1} A_i P_i(t) \cos[(\omega + \Delta\omega)t]$
- $d(t)$ – BPSK HOUSEKEEPING DATA
- $\{P_i(t)\}$, $i = 0, 1, \ldots, N-1$; PN CODES
  - PN CODES AND AMPLITUDES ($A_i$) MAY DIFFER
  - PN CODE EPOCHS COINCIDE
  - EACH PN CODE BANDWIDTH IS INTEGER MULTIPLE OF SMALLEST
- $\{\Delta F_i/\Delta F_1\}$, $i = 1, \ldots, N-1$ – SEQUENCE OF INTEGERS
- ALL PN-CODED SINUSOIDS ARE MUTUALLY COHERENT

FIG. 2D

A) DATA FRAME STRUCTURE

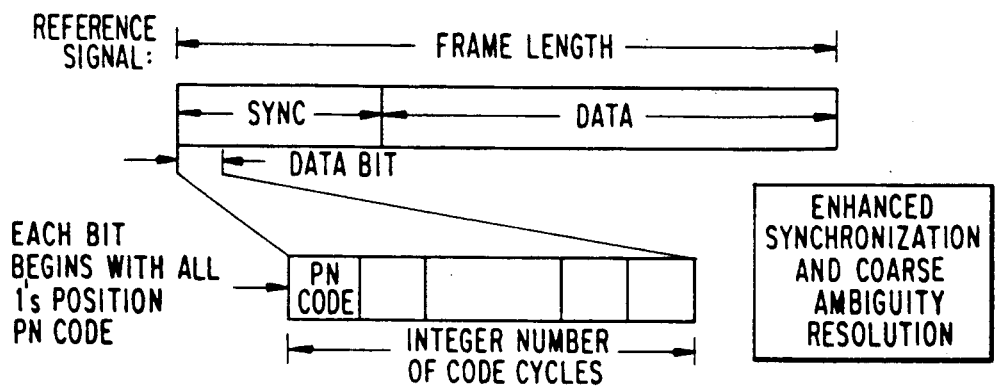

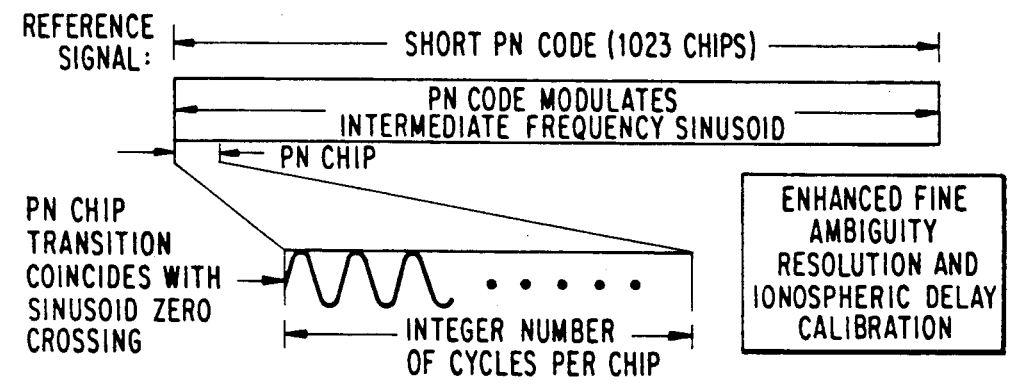

B) DATA CHARACTERISTICS

- SYSTEM DATA MAY ENCOMPASS SEVERAL DATA FRAMES
- DATA TRANSMITTED VIA FIXED FRAME LENGTHS
  - FRAME LENGTH PROVIDES COARSE AMBIGUITY RESOLUTION
  - FRAME LENGTH OF 8 SEC SUPPORTS >>100,000 MILES AMBIGUITY RESOLUTION
- ESTIMATED DATA RATE, 125 BPS
  - REFLECTS PROPOSED ATDRSS NAVIGATION SIGNAL BASELINE
  - ALSO REFLECTS MINIMUM COMMAND DATA RATE SUPPORTED BY TDRSS USER TRANSPONDER
  - 1,000 BITS PER 8 SECOND FRAME
  - OPTION: RATE 1/2 CODING
- FRAME COMPOSITION
  - FRAME SYNC WORD
  - ERROR CONTROL FIELD
  - SYSTEM TIME (e.g., GMT) AT ONSET OF MASTER-STATION TRANSMISSION OF FRAME
  - CLOCK CALIBRATION DATA FOR REMOTE STATIONS
  - TDRSS EMPHEMERIS DATA AND AGE OF DATA
  - OTHER (e.g. MESSAGES TO USER SPACECRAFT, ALMANAC PARAMETERS FOR ALL TDRSS SATELLITES)

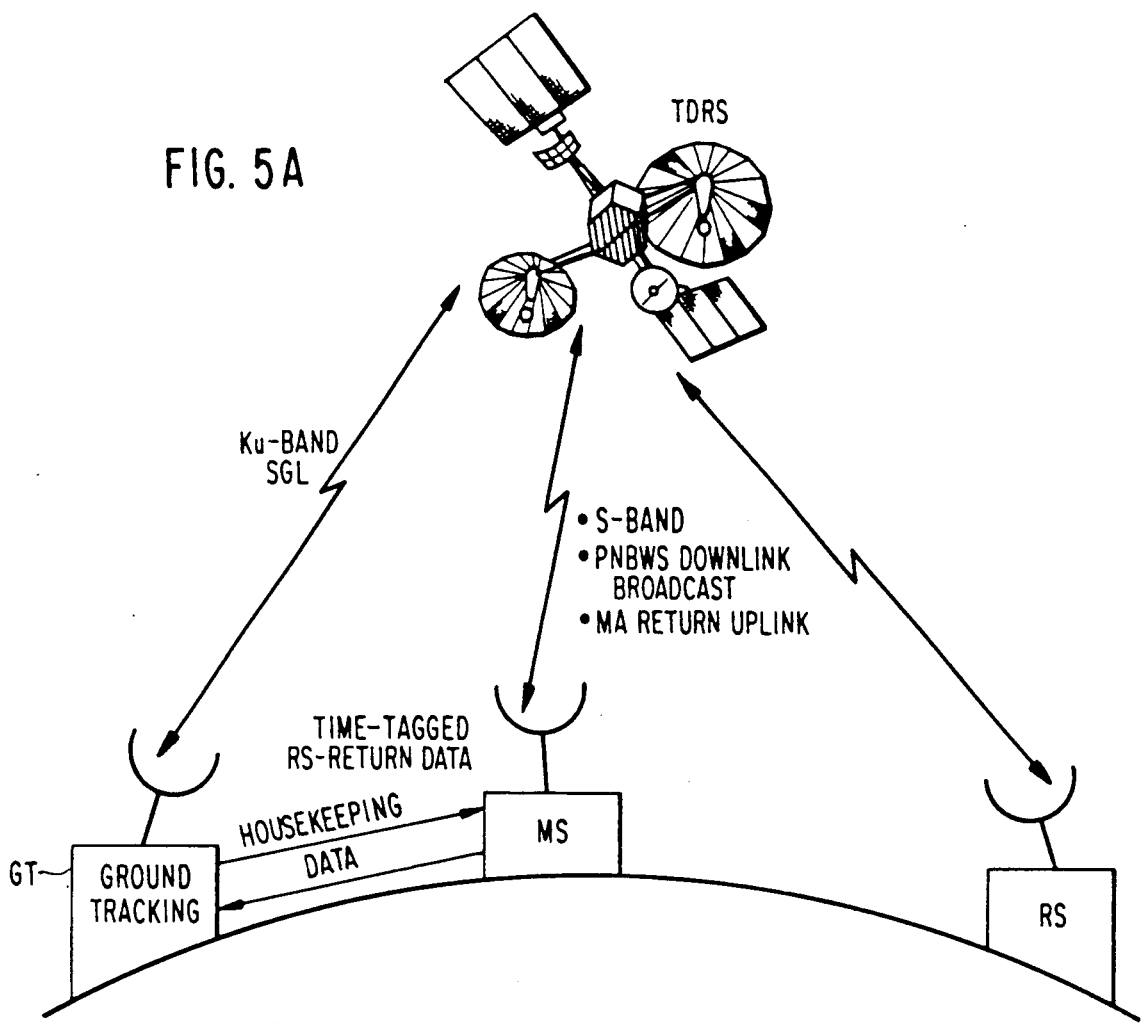

FIG. 5A

FORWARD PNBWS PATH
  MS-WSGT-TDRS-RS
RETURN PNBWS PATH
 • VIA TDRSS MA RETURN LINK
 • RS-TDRS-WSGT-MS
ADDITIONAL CONSIDERATIONS
 • MS ALSO SERVES AS RS
 • MS TIME REFERENCE BASED ON WSGT MASTER CLOCK
   (CESIUM STANDARD OR BETTER)
 • PNBWS BROADCAST PERMITS PRECISE/CONTINUOUS
   RS FREQUENCY SYNCHRONIZATION
   (NO RETURN LINK REQUIRED)
     — ONLY PHASE (CLOCK TIME BIAS) SYNCHRONIZATION
       REQUIRES RETURN LINK
     — INFREQUENT PHASE SYNCHRONIZATION UPDATES REQUIRED

FIG. 5B

• MS→RS TRANSMISSION (PNBWS SIGNAL):

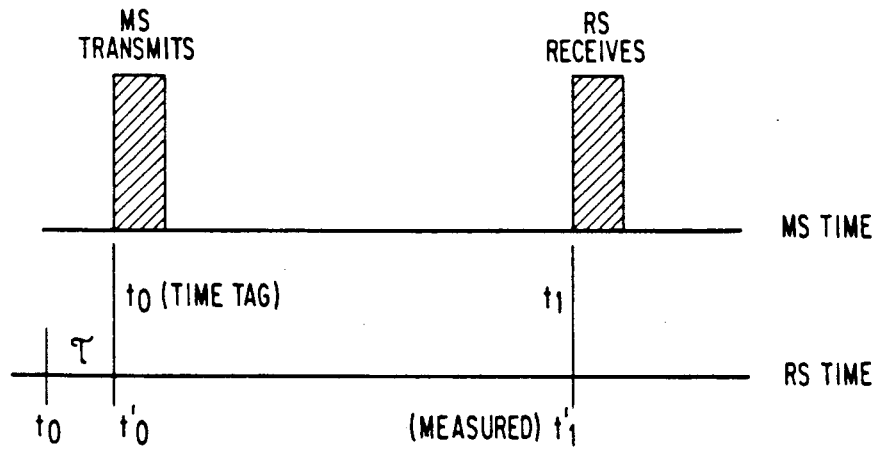

• RS→MS TRANSMISSION (CALIBRATION SIGNAL):

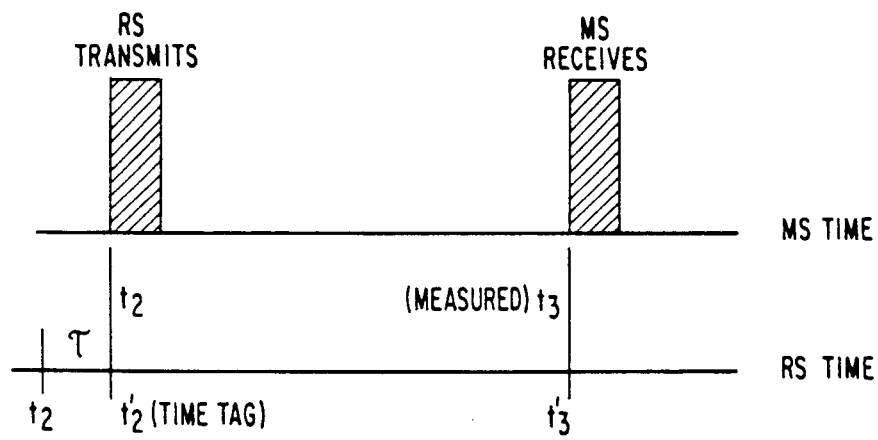

| MEASUREMENTS | FWD | $T_F = (t'_1 - t_0) = (t_1 - t_0) + \tau + \varepsilon_F$ |
|---|---|---|
| | RTN | $T_R = (t_3 - t'_2) = (t_3 - t_2) + \tau + \varepsilon_R$ |
| CLOCK BIAS ESTIMATE | | $\hat{\tau} = (T_F - T_R)/2$ |
| BIAS ESTIMATE ERROR | | $\tilde{\tau} = \Delta T_{FR} + \varepsilon_F - \varepsilon_R$ |
| $\Delta T_{FR}$ | | RESIDUAL SYSTEMATIC ERROR BETWEEN FWD & RTN PROPAGATION PATH |
| $\varepsilon_F, \varepsilon_R$ | | RANDOM ERRORS IN FWD & RTN TIMING MEASUREMENTS |

FIG. 12

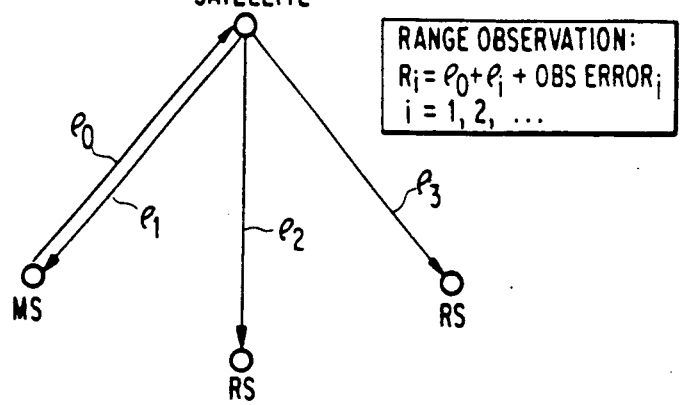

| SOURCES OF OBSERVATION ERRORS | METHOD OF MEDIATION |
|---|---|
| IONOSPHERIC DELAY | PNBWS PPOCESSING (PREPROCESSOR) |
| TROPOSPHERIC DELAY | WATER VAPOR RADIOMETER (PREPROCESSOR) |
| SYSTEMATIC DELAY | HARDWARE CHARACTERIZATION (PREPROCESSOR) |
| STATION GEODETICS UNCERTAINTY | ACCURATE SURVEYS |
| MEASUREMENT AMBIGUITY | ENHANCED RESOLUTION VIA PNBWS |
| UNRESOLVED TIME BIAS/ DRIFT BETWEEN STATIONS | SYSTEM SYNCHRONIZATION AND MODELING |
| CHANNEL NOISE | SIGNAL PROCESSING |

FIG. 13

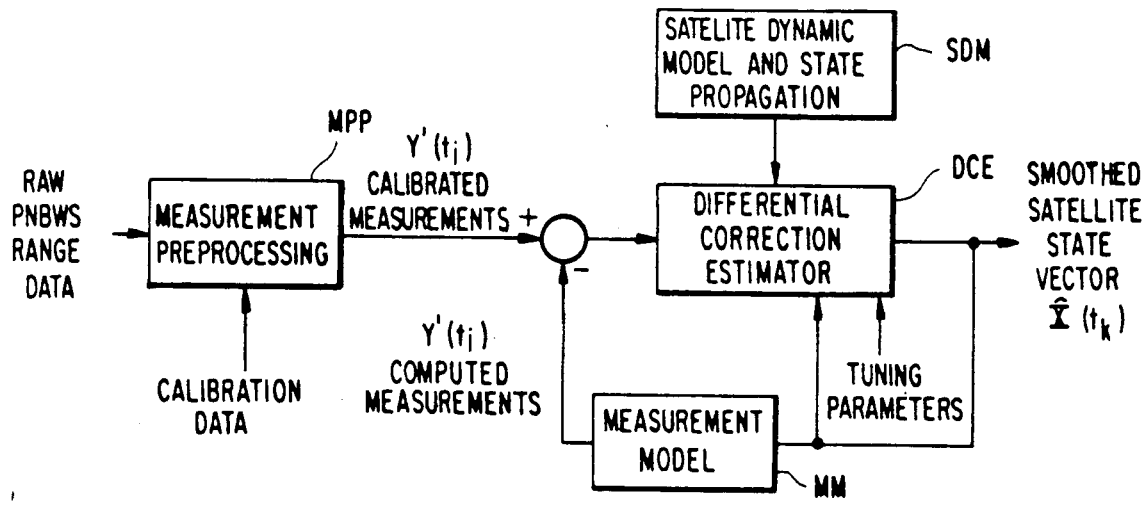

PRECISE SATELLITE RANGING AND TIMING SYSTEM USING PSEUDO-NOISE BANDWIDTH SYNTHESIS

This is a continuation of application Ser. No. 07/174,400, filed Mar. 28, 1988, which was abandoned upon the filing hereof.

BACKGROUND AND BRIEF DESCRIPTION OF THE INVENTION

The successful operation of any satellite communication system requires a capability to accurately determine the orbits of all satellites involved—whether they are in geosynchronous or low earth orbits. Also of importance is a growing interest in accurate, on-board navigation capabilities for low-earth orbiting (LEO) satellites. In particular, future requirements for earth observation missions call for LEO spacecraft orbit determination (OD) accuracies approaching the 10 m ($1\sigma$) level. Supporting this capability with Tracking and Data Relay Satellite System (TDRSS) implies orbit determination (OD) accuracies for TDRSS satellites in the 25 m ($1\sigma$) range.

Of the available techniques for orbit determination, pseudo-noise (PN) and tone-ranging-based multilateration potentially permits near real-time operation. PN ranging is a key feature of the Global positioning System (GPS) and currently is extensively used by the Tracking and Data Relay Satellite System. Tone ranging is another well established technique, but its utility is typically limited by narrow antenna beam width requirements on space-to-ground transmissions due to flux density concerns. Interferometry and, in particular, Long Baseline Interferometry (LBI) utilizing stellar radiation sources, is taking on increasing significance for the precise determination of ground-station locations. Ongoing studies and experiments are being conducted to assess the feasibility of applying interferometry to TDRS orbit determination.

For orbit determination processes which rely on propagation delay and delay-difference measurements, as with PN/multilateration and LBI, availability of sufficient signal bandwidth is the key to providing a fine resolution time measurement capability (e.g., to the nanosecond level or less). Unfortunately, even if sufficient contiguous bandwidth is available (e.g., 50–100 MHz;, hardware and processing limitations may preclude a system from taking full advantage of the bandwidth resource. In addition, external error sources, such as ionospheric delay, may introduce bias errors that dramatically degrade range measurement accuracy, and are not easily calibrated out.

in interferometry, where the requirement for high rate data transfer from the dispersed observation sites to a central processor severely limits contiguous bandwidth usage, a technique termed "Bandwidth Synthesis" (BWS) has been developed. This involves the processing of energy in several narrow, disjoint frequency bands in a manner that effectively leads to a time resolution capability corresponding to the entire bandwidth spanned by the disjoint bands. Accordingly, a wide bandwidth (e.g., >50 MHz) can be synthesized from several distinct narrow bandwidth components (e.g., 2 MHz apiece).

The object of the present invention is to provide an improved ranging and timing system for tracking and data relay satellite system in which the bandwidth synthesis technique is incorporated in pseudo-noise ranging to produce a system having unique properties and capabilities not presently available via other techniques. According to the invention, a precise ranging and timing system incorporating the pseudo-noise bandwidth synthesis technique provides precise orbit determination for geosynchronous and low earth orbit satellites. The system is predicated on a novel signal structure which is comprised of several disjoint, narrow-band spectral components spread over a wide bandwidth. The number of spectral components, their individual bandwidths, and their specific spectral locations over the end-to-end spread bandwidth determine the ultimate capabilities and performance achievable. The broad beam transmission of the precise ranging and timing system signal, via geosynchronous satellite, provides the system capability suitable equipped users for multiplicity of purposes including precise orbit determination, navigation of low-earth orbiting satellites through signals transmitted through geosynchronous satellites and precise time transfer.

Accordingly, the use of pseudo-noise bandwidth synthesis (PNBWS) according to the invention, overcomes a variety of operational concerns and provides enhanced performance benefits. In particular, PNBWS does not demand the use of hydrogen masers that may be required in ultra-fine resolution interferometric applications. Also, data transfer rate requirements should be much lower for PNBWS since intererometry involves the transfer of unprocessed data, while PNBWS only requires that low rate data (e.g., <1 kbps), reflecting derived range information, be transferred among sites. Utilization of the known coherent, PN code signal structure may further permit simplified means for ambiguity resolution, self-contained ionospheric delay calibration, and self-contained network clock synchronization. Finally, PNBWS-related enhancements lead to significant range measurement accuracy improvements which, in turn, may ease network geometry considerations. In particular, in the TDRSS context, an all Continental United State (for example) based network of PNBWS ground terminals may meet or exceed TDRSS orbit determination accuracies currently achievable via the Bilateration Ranging Transponder System (BRTS), which employs non-continental united state terminals.

The key features of novel PNBWS tracking technique as disclosed herein:

1) time-of-arrival measurement accuracies to within 0.1 NS RMS potentially achievable,
2) combines benefits of PN ranging, tone ranging, wideband interferometry, while overcoming limitations of prior systems,
3) provides self-contained capability for accurate calibration of key error sources (ionosphere, group delay, clock biases),
4) enhances currently proposed advanced TDRSS (ATDRSS) navigation beacon,
5) simultaneously applicable to:
   a) TDRS orbit determination
   b) user spacecraft on-board navigation
   c) time and frequency transfer among widely separated space and/or ground-based terminals.

Key benefits of the invention to TDRS orbit determination:

1) improved ephemeris tracking accuracy, $\leq 25$ M RMS compares to 50–100 M for existing bilateration ranging transponder system (BRTS)

2) no ground stations outside Continental United States (CONUS) required,
3) accurate calibration of key error sources,
4) no scheduled forward link resources required,
5) minimal MA return link resources required.

Key benefits of the invention to TDRSS user navigation: Enhanced Beacon Navigation performance Via:
1) improved TDRS ephemeris accuracy,
2) reduced sensitivity to dynamic modeling errors (gravitational, drag)
3) precise pseudo-ranging via PNBWS processing The uniqueness of the pseudo-noise bandwidth synthesis concept principally arises from its novel signal structure, which, as noted above, comprises several disjoint, narrowband spectral components spread over a wide bandwidth. The number of spectral components, their individual bandwidths, and their specific spectral capabilities and performance achievable. While the bandwidth synthesis concept was developed for interferometric signalling purposes, according to the present invention, the added intelligence and a priori information embedded in the pseudo-noise bandwidth synthesis signal not only enhances the corresponding interferometric capability, but simultaneously combines benefits and overcomes limitations of both pseudo-noise and tone ranging. For example, the pseudo-noise bandwidth synthesis according to the invention provides a much greater bandwidth than conventional pseudo-noise systems, at no increase in complexity. In addition, the wideband time resolution achievable via the tone ranging is also achievable by way of the present invention but the present invention further satisfies flux density constraints and may afford enhanced ambiguity resolution relative to conventional tone ranging; the latter is based on the simultaneous PN code presence, with additional housekeeping data superimposed.

BRIEF DESCRIPTION OF THE DRAWINGS

The above and other objects, advantages and features of the invention will become more apparent when considered with the following specification and accompanying drawings wherein:

FIG. 1 is a schematic illustration of a satellite ranging and timing system using pseudo-noise bandwidth synthesis incorporating the invention, FIG. 2a is a spectral presentation tailored to a tracking and data relay satellite system according to the invention, FIG. 2d illustrates the PNBWS transmit signal characteristics including the data frame structure and a chart of data characteristics, FIG. 5a is a diagrammatic illustration of the system clock synchronization, and FIG. 5b is a diagrammatic illustration of the details of the clock synchronization scheme, FIG. 12 illustrates the PNBWS measurement model, FIG. 13 is a block diagram illustrating the batch orbit determination process.

DETAILED DESCRIPTION OF THE INVENTION

Figure 2B:
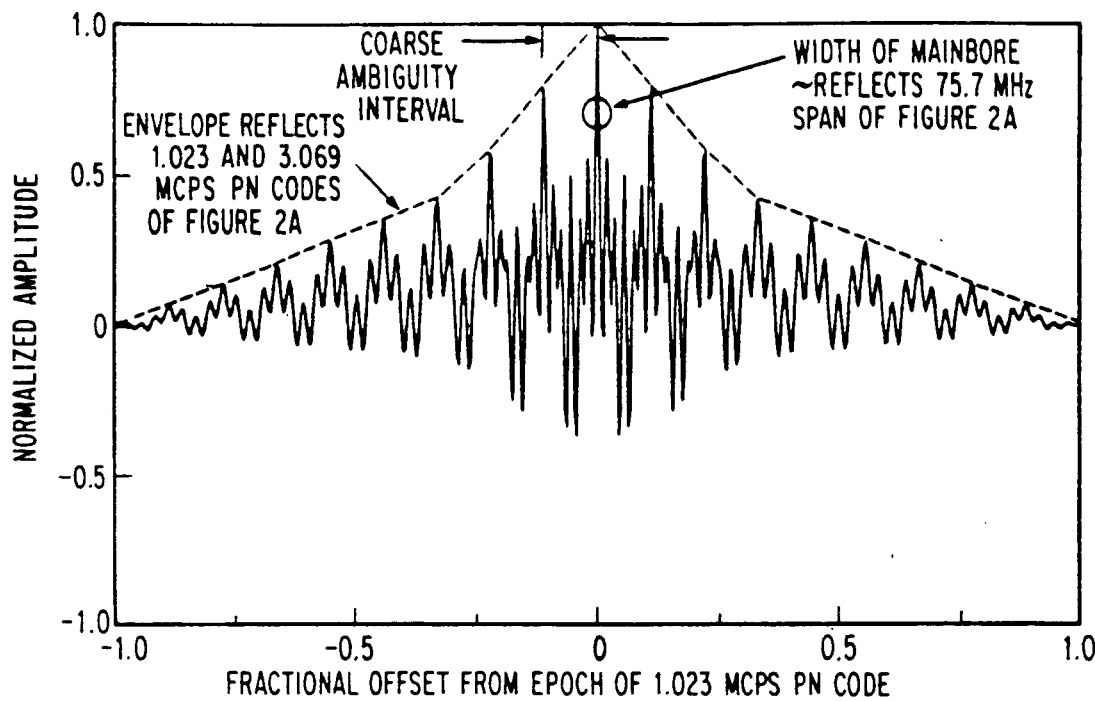
FIG. 2b illustrates ATDRSS unique composite correlation function with a four component ARSAC.

Referring now to FIG. 1, the system architecture includes a tracking and data relay satellite 10 having solar panels 10SP and a plurality of on-board antenna 10-1, 10-2, 10-3 for receiving and transmitting signals in the various bands indicated. A low earth orbit (LEO) second navigation satellite is indicated at 11 having its deployed solar panels 11SP and various receive and transmit antenna 11a. Master station 12 is a ground tracking station equipped for tracking and data relay with the satellite system and is coupled with a network control center 13 via communication link 13CL and a flight dynamics facility 14 via communication link 14CL. A plurality of remote stations RS1, RS2 ... RSN, each operating in the S-band with the pseudo noise bandwidth synthesis signal illustrated in FIG. 2a are located at various earth locations.

FIG. 2a illustrates a four-component pseudo noise bandwidth signal spread over a 75.7 megahertz bandwidth and with each component having the much narrower bandwidth shown with the separation between components being as illustrated. For example, component C1 may have as its bandwidth 2.046 megahertz and centered at 2032.7 megahertz, whereas component $C_n$ as its bandwidth of 6.138 megahertz and in this embodiment is used as a baseline navigation beacon in a tracking and centered at 2.106.4 mHz data relay satellite system. This particular spectral representation is tailored to advanced tracking data relay satellite system but it will be appreciated that the spectral representation can be tailored for many other particular functions. In this embodiment, the pseudo noise bandwidth synthesis system is based on a frequency division multiplexed scheme which has the exemplary format illustrated in FIG. 2c. The number of spectral components, their individual bandwidths and their specific spectral locations over the end-to-end bandwidth determine the ultimate capabilities and performance achievable.

Thus, FIG. 2a illustrates a representative PNBWS signal, which is spectrally consistent with the TDRSS forward link allocation, and identifies the 3 Mcps PN-encoded "Baseline Navigation Beacon", situated at its nominal 2106.4 MHz location. The three auxiliary PN cods form the remainder of the four-component PNBWS signal—with the relative spectral spacings reflecting the optimum "ARSAC" set.

Figure 2C:
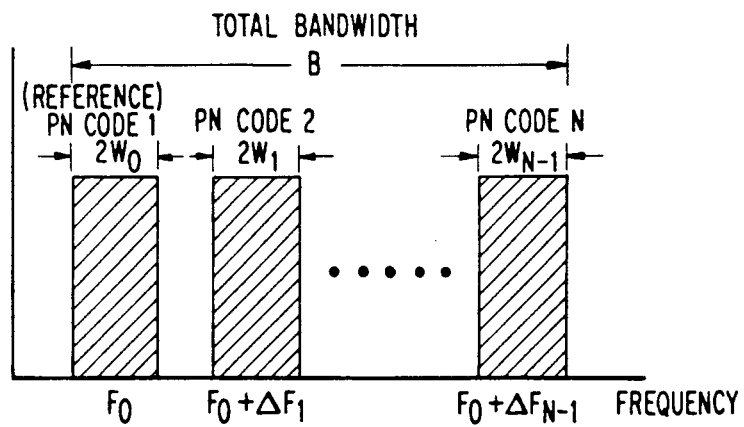
FIG. 2c illustrates the PNBWS frequency division multiplex scheme.

Optimality here refers to the nature of the associated synthesized correlation function—obtained through suitable receiver processing. As seen in FIG. 2b, the width of the main lobe reflects the end-to-end spectral spacing and provides the PNBWS ultra-fine resolution capability, while the successive major side lobes reflect the smallest spectral spacing and provide a measure of coarse ambiguity resolution achievable; the intermediate values between major side lobes are undesirable, and their effects are minimized through utilization of the "ARSAC" set—hence its optimality. FIG. 2a further emphasized the fact the LEO spacecraft not desiring access to the full PNBWS waveform, may access the "Baseline Navigation Beacon" only, or a subset of the remaining components as well.

Figure 3A:
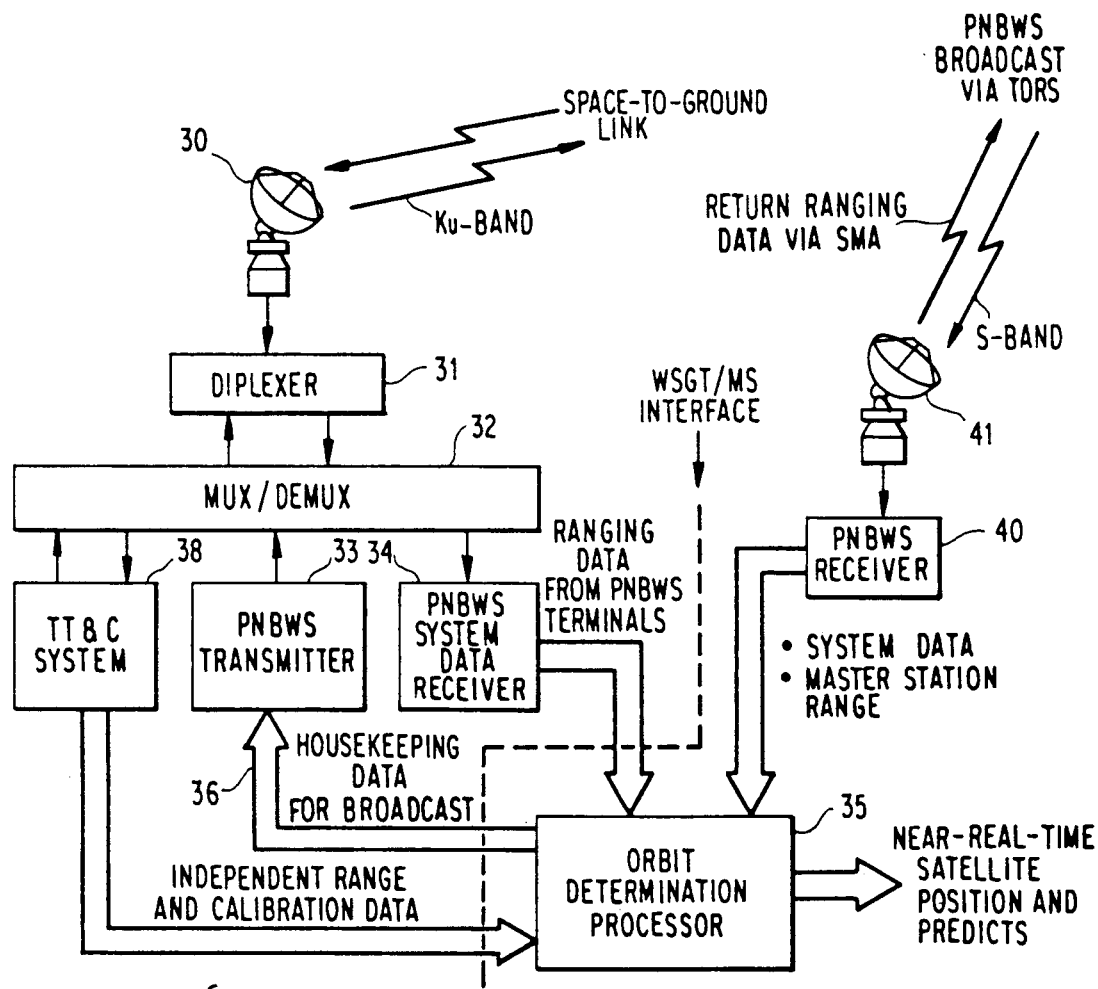
FIG. 3a is a block diagram of the Master Station (MS) components illustrating signal flow therein.
Figure 3B:
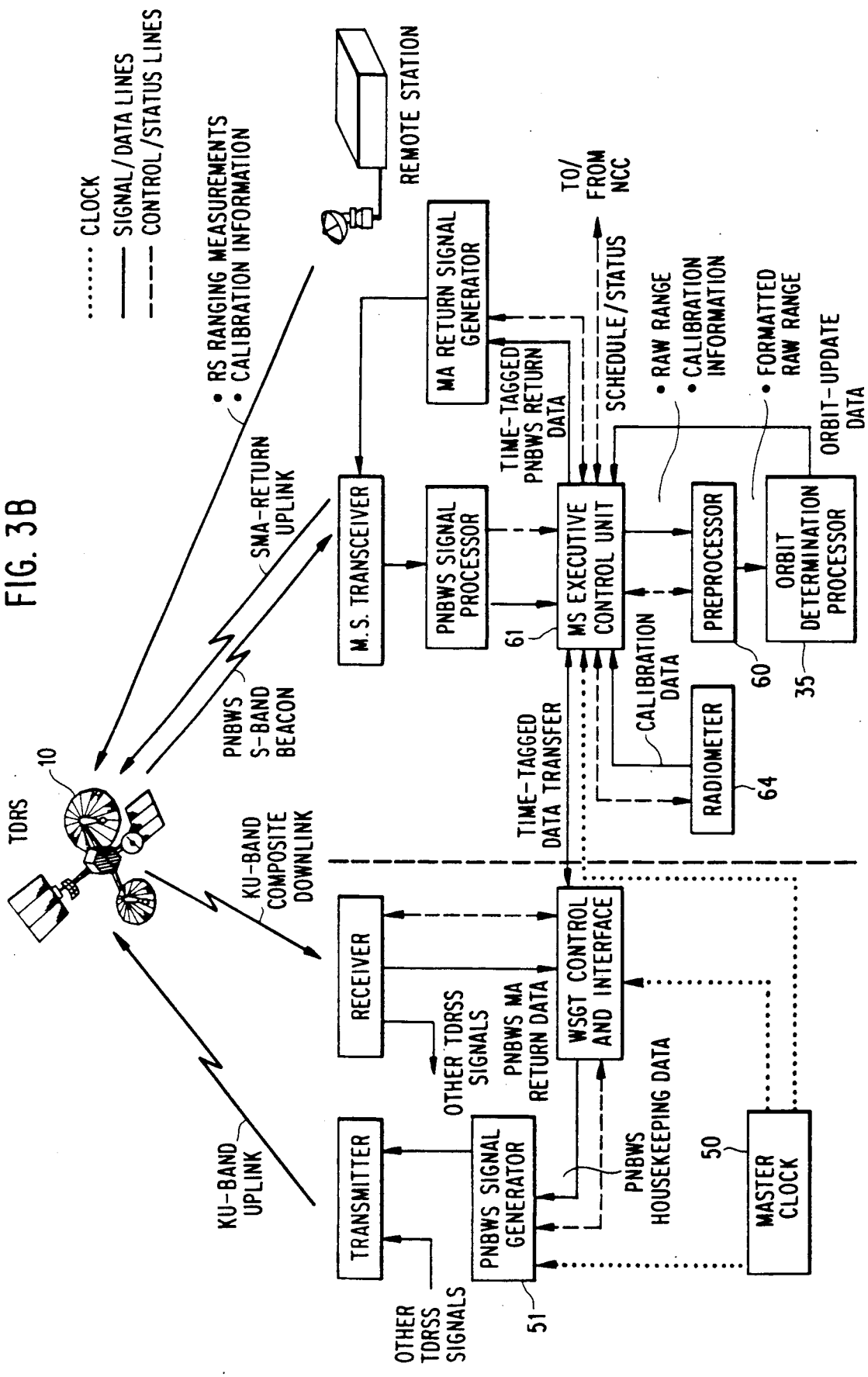
FIG. 3b is a more detailed block diagram of the master station illustrating its components and signal flow paths.

A block diagram of a master station (MS) is show in FIG. 3a as it applies to an advanced tracking and data relay satellite system. The functions of the master station are diagrammatically illustrated and laid out in FIG. 3a and, a block diagram of the master station showing its system components and signal flow are illustrated in FIG. 3b. As shown in FIG. 3a, a communication satellite antenna 30 is coupled through a diplexer 31 to a multiplexer/demultiplexer 32 which sequentially couples and interleaves different components of the system to the pseudo noise bandwidth transmitter 34 and to the system data receiver 33. Housekeeping data for broadcast purposes which originate in the orbit determination processor 35 are conveyed via a data channel 36 to transmitter unit 34. The orbit determination processor 35 also receives independent range and calibration data from the tracking and control system 38 which is coupled to the antenna 30 via the multiplexer/demultiplexer unit 32 and diplexer 31. As indicated in FIG. 3a, communications on the space-to-ground link is in the Ku-band of frequencies whereas frequencies in the S-band are utilized for the other functions illustrated.

The master station MS itself has a receiver 40 which receives system data and the master system range data via a separate antenna 41 and, operates in the S-band to receive the pseudo noise bandwidth synthesized broadcast from the satellite 10 and supplies system data and master station range information to orbit determination processor 35.

The master station components and signal flow are illustrated in FIG. 3b. As shown in FIG. 3b, a master clock 50 at the master station is used to provide a master signal to the pseudo-noise bandwidth synthesized signal generator 51. This master station serves as the ground mode interface with each satellite tracking and data relay satellite 10. As such, it receives time-tagged house keeping data from the master station executive control unit 61 and superimposes it on the pseudo noise bandwidth synthesis beacon signal generated within the ground terminal and transmitted as part of the composite Ku-band up-link to satellite 10. The return link transmissions from each remote station RS. which contain the remote station extracted ranging and calibration data, are also received by the ground terminal. The demodulated and time-tagged remote station data is then transferred to the master station MS for final orbit determination processing in the orbit determination processor 35. The ground terminal master clock 50 (which may be a cesium standard) also plays a key role in providing the time reference for all pseudo-noise bandwidth synthesized transmissions/receptions at the ground terminal, and in further providing associated timing and synchronization information to the master station via the interfaces shown. Highly accurate (within 1-3 NS or less) network clock synchronization is important to support the pseudo noise bandwidth synthesizing operations and will be described briefly later herein.

As further seen in FIG. 3b, the master station serves the following roles:

1. It is the end processor of the remote station ranging and calibration data yielding the satellite orbit determination and other data (e.g., clock calibration updates for transmittal to remote stations).
2. Generation of housekeeping data for the ground terminals where it is superimposed on the pseudo noise bandwidth synthesized beckon signal.
3. The remote station equivalent processing of the received S-band signals and the associated MA return link transmission of the extracted ranging and calibrated data which includes extracted ranging and calibrated data that is directly applied to the satellite orbit determination processing. The remote station role of the master station serves to eliminate the need for an additional remote station. In addition, its re turn link MA transmission also provides a basis for network clock synchronization.

Within the master station, the pre-processor 60 accepts raw ranging and calibration data from the master station executive control unit 61 and using the calibration information, generates a formatted range measurement signal suitable for use in the orbit determination processor 35. The calibration information is unique to the remote station and the master station and includes: the ionospheric delay, clock bias, and tropospheric delay (derive via a water-vapor radio meter 64). Since the orbit determination processor 35 does not require continuous information from each remote station, the option exists for the master station to process remote station data in either a batch or time sequential fashion, which is another advantage of the invention.

Figure 4:
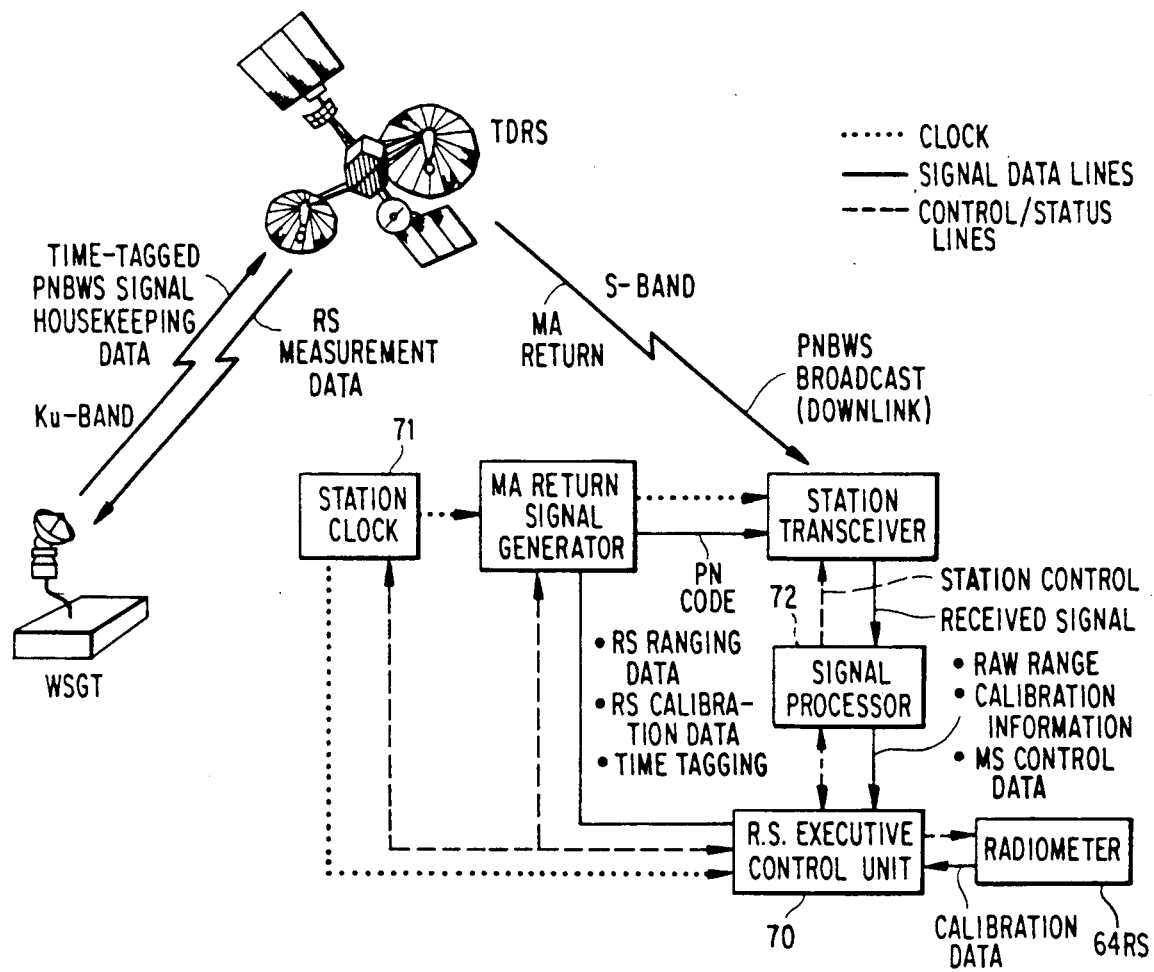
FIG. 4 is a block diagram of a Remote Station (RS) illustrating its components and signal flow according to the invention.

Referring now to FIG. 4 which illustrates the remote station components and signal flow, it is pointed out that the primary function of the remote station is to provide ranging and calibration data to the master station by appropriately processing the received pseudo noise bandwidth synthesized signal from the satellite 10. This signal processing is essentially the same as that employed by the master station in its ranging measurements. The detailed block diagram of the remote station and the signal flow among the major components is illustrated in FIG. 4. The key drivers in the design of the remote station are the needs to minimize complexity and cost and to require little or no on-site operator control during normal operation. The remote station receives the S-band components of the pseudo noise bandwidth synthesized signals and performs demodulation and removes any housekeeping data superimposed on the pseudo noise bandwidth synthesized signal. Relevant information is routed to the remote station executive control unit 70 which generates a station clock synchronization signal for calibration of the station clock 71.

A raw ranging measurement and receiver tracking data is generated within signal processor 72 and the relevant information is routed to the remote station executive control unit 70 for use in station control and calibration of the remote station clock 71. This ranging measurement and receiver tracking data is also used to update the receiver tracking loops and the ranging data is sent to the executive control unit 70 where the information is necessary for orbit determination is gathered. The remote station executive control unit 70 also collects all other pertinent information such as a radiometer 64RS readings, and any measurement calibration data generated by the signal processor 72 and transmits it via the satellite master antenna return link to the ground terminals for final transfer to and use by the master station pre-processor 60 (FIG. 3b). The MA return link transmission is also appropriately time-tagged by the local remote station clock 71. As noted above, this return link is also used to support the network clock synchronization generated via a master clock 50 of FIG. 3b.

Four error sources of significance to the present invention and its applications are the system clock biases, ionospheric delay, group delay and tropospheric delay. The system for estimating and/or mitigating the effects of these possible error sources is presented in the following section with the key consideration being the ability of the system signal design to permit self-calibration.

The specific clock synchronization requirements depend on orbit determination accuracy requirements, other distortion levels, and network geometry but an accuracy on the order of about 1 ns appears necessary. Options for achieving this accuracy can be selected from a GPS calibration, other external calibration or the use of hydrogen mazers and self-calibration. Self-calibration is preferred.

Since each remote station introduces its own clock bias, it is clear that increasing the number of stations increases the number of unknowns and must be solved ass a part of the orbit determination process. Accordingly, system time does not easily "fall out" as a product of the, orbit determination process. For this reason, the advanced tracking and data relay satellite system baseline is introduced. This system block synchronization is shown in FIG. 5 and for this process, two types of transmissions are used. One is the forward path signal (MS-to-RS) used in the normal, unscheduled system operational mode. The second is the MA return path, which is periodically scheduled to sequentially support the remote station return link transmissions to the master station. These return transmissions primarily contain the remote station generated ranging data, together with ionospheric and tropospheric calibration data. In addition, each remote station return transmission is used, as necessary, to support the remote station clock synchronization. That is, an estimation and extraction of clock phase and frequency biases.

The MA return channel requirement per each remote station is sufficiently small (5 minutes per hour or less) so that the equivalent of less than one MA channel is adequate to support all remote station return transmission and this includes master station return transmissions wherein the master station access a remote station. As an alternative, the use of a pseudo noise bandwidth synthesized signal-like return transmission, via a diplexed beacon element on the satellite. Such a capability would improve the return link time-measurement resolution and preclude the need for return link scheduling.

For both forward and return transmissions, time-tagged data is superimposed on the signal to permit measurement of the apparent elapsed time at each end of the link. (See FIG. 5b which discloses the details of the system clock synchronization and the considerations thereof.) Since the remote station clock bias adds to the measured transmit time on one path and subtracts on the other, differencing the measurements yields an estimate of the clock bias.

Clock calibration accuracy is affected by both systematic errors and random errors. Systematic errors ($\Delta T_{fr}$) arises if any difference between ($t_1 - t_0$) and ($t_3 - t_2$) cannot be resolved; and this may result from any unknown non-reciprosity in forward and return link delays and/or satellite/location correction errors if the transmissions are not simultaneous.

As noted earlier, the remote station role of a master station is crucial in maximizing the clock calibration efficiency and minimizing the effects of systematic errors. As shown in FIG. 5b, all forward signals and MA return signals and transmissions follow the same satellite-ground terminal-master station path with the unique transmission path being the satellite to remote station/master station (PNBWS FORWARD); the remote station/master station-to-satellite; and forward-to-return turn around path within each remote/master station couple.

When the master station serves as a remote station, its forward-return turn around path can precisely account for the difference in transit times between the satellite S-band input/output and the master station mode of the master station ground terminal interface. This is based on the fact that the master station clock is the system clock thereby precluding the need for any associated clock bias solution requirements. Accordingly, all that is required is an accurate periodic measurement update of the turn around time within each remote station/master station. This may be loosely termed here the "range zero set". The uncertainty in absolute master station-to-satellite forward transit time is part of the forward path bias uncertainty and must be kept to a minimum (e.g., less than 1 m) via pre-launch measurements.

Based on the above, and the associated assumption that analogous 1 ns range zero set calibration can be achieved at each remote station, the calibration procedure highlighted in FIG. 5a and 5b (clock synchronization) yields clock bias estimation accuracy consistent with the high quality MA return link—i.e. one that reflects a remote station return transmission via a one-to-two meter dish antenna. Based on the three MCPS master antenna PN code, and the assumed ground tracking station ability to provide an RMS PN tracking error of less than 3%, it follows that a remote station clock bias estimation error of less than 9 NS (3 m) RMS can be achieved via a single observable. Averaging/smoothing (e.g. over a five minute calibration interval) should be further capable of reducing this error to less than 1 M RMS.

Figure 6:
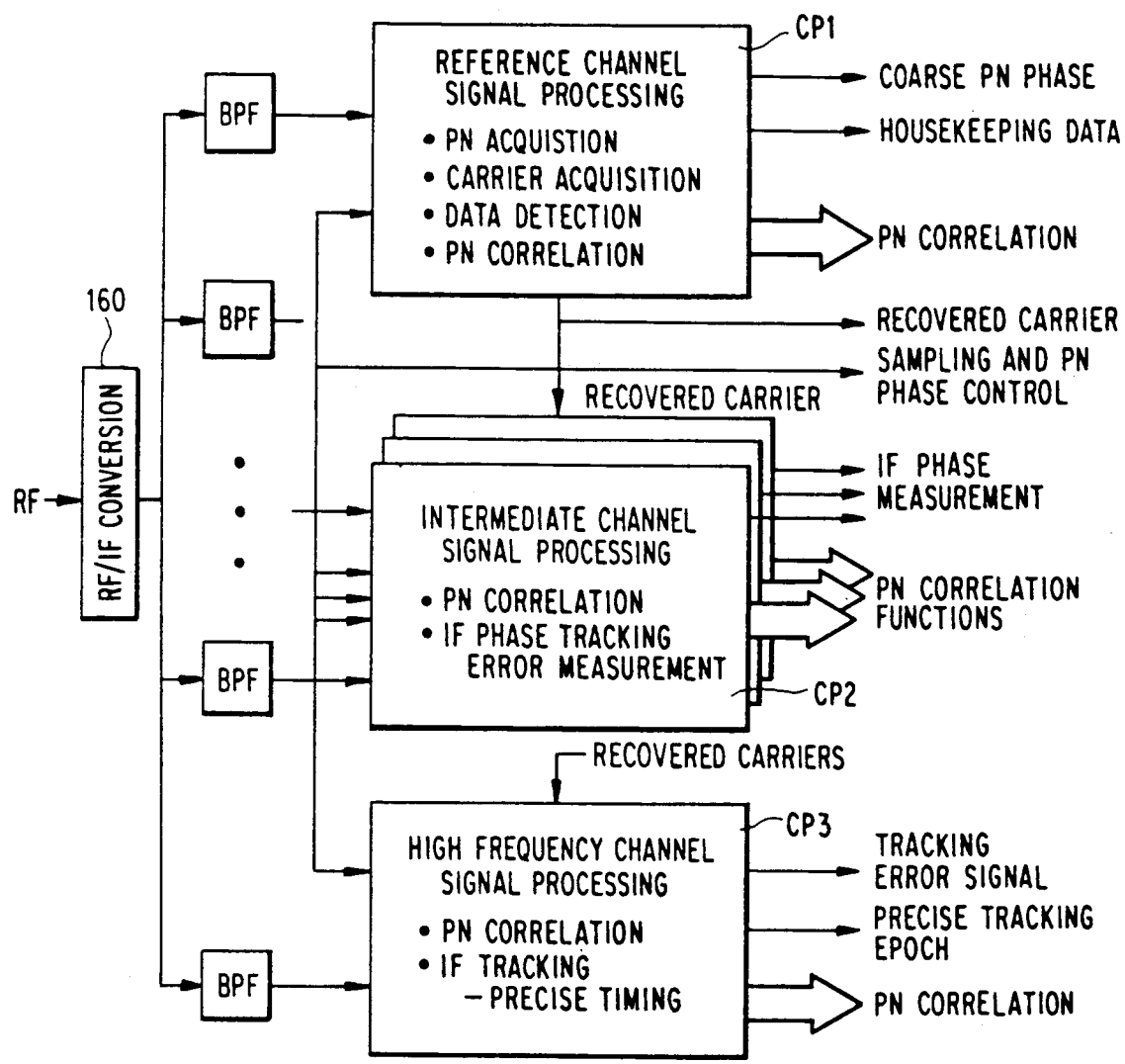
FIG. 6 is a schematic illustration of the receiver processing functions.

Receiver processing functions are outlined in FIG. 6. Incoming RF signals are connected to IF signals by connector 160 and supplied via bandpass filters BPF to different channel processing CP1, CP2 and CP3 to provide the indicated outputs.

If the clock updates are infrequent, associated errors would have to be considered as biases. On the other hand, sufficiently frequent updates can serve to randomize this error source and thus be more attractive for orbit determination purposes. By the use of high quality clocks (e.g., less than $10^{-12}$ drift per hour) can be used to bridge the gap between calibration updates. Alternatively, the received pseudo noise bandwidth synthesized signal itself can be used at each remote station to effectively reproduce the master station frequency standard and essentially maintain frequency synchronization on a continuous basis. This is another advantage of the signal format of the present invention wherein a multispectral signal structure is employed. This assumes that the satellite doppler shift is known with high accuracy and may be calibrated from the remote station received PNBWS signal.

As is well known, radio frequency (rf) signals passing through the ionosphere are delayed by time increments that depend on the corresponding electron content. The specific delay is inversely proportional to the square of the operating frequency and, in view of the S-band frequency spectrum (2 gigahertz) it can be expected that ionospheric delays of 50 NS or less with delay dropping to the order of less then 1 NS at the 14 gigahertz band. Thus, in the S-band operation, ionospheric delay calibration is required. Two common techniques for ascertaining the ionospheric delay involved the use of ionospheric delay models and dual frequency calibration. The dual frequency calibration process is utilized in the present invention to produce ionospheric delay correlation function. Dual frequency calibration may be achieved using several processes. One process involves a utilization of a pair of signals which are separated approximately 350 megahertz so that any terminal that can access these signals can perform the calibration.

One involves utilization of the GPS $L_1$ and $L_2$ signals which are separated by approximately 350 MHz. Thus, any terminal that can access these signals can perform calibration. Of course, additional receiver equipment is required that is not otherwise used by the PNBWS terminal. Further estimation/interpolation would also be required to translate GPS-derived data to the specific TDRSS-to-ground path of interest.

in the context of TDRSS, S, C, and Ku-band frequencies are available, with relative frequency spreads exceeding 2 GHz. Of course, active scheduling of the appropriate services are required in order to access these signal frequencies and complex transmit/receive equipment would be required to take advantage of such large frequency spreads.

A third possibility involves PNBWS self-calibration at the S-band frequencies of interest. Toward this end, a PNBWS signal structure is assumed with at least three spectrally separated PN codes and an ionospheric delay calibration approach is qualitatively suggested.

Recall that the transmitted PN epochs coincide, while the PNBWS differential frequency sinusoids $F_1$, $F_2$, etc.) reflect integer ratio relationships among their frequencies—i.e., $F_k/F_1$ is an integer. Accordingly, PNBWS processing yields the following:

Epoch estimates for each of the PN codes,
Differential frequency sinusoids: $\sin(\omega_1 t + \theta_1)$, $\sin(\omega_2 t + \theta_2)$, ...

Note that these sinusoids, by design, are coherent in the absence of distortions—i.e., their zero crossings coincide at regularly spaced intervals, with each other and with the PN code epochs.

For PNBWS frequency separations of interest—i.e., $\leq 100$ MHz—the noise corrupted PN epoch estimates are, by themselves not sufficiently accurate for the present calibration process. On the other hand, the phase locked loop (PLL) tracking of the sinusoids provides considerable time resolution. Thus, the measurement and smoothing of the phase differential shown directly yields the delay, and, hence, the calibration constant K.

The above discussion thus implies that via appropriate signal design and receiver processing, PNBWS self-calibration of ionospheric delay is achievable. This is a significant PNBWS system feature, which, for link parameters of interest, yields ionospheric estimates that reflect errors $<1$ ns rms.

Figure 7:
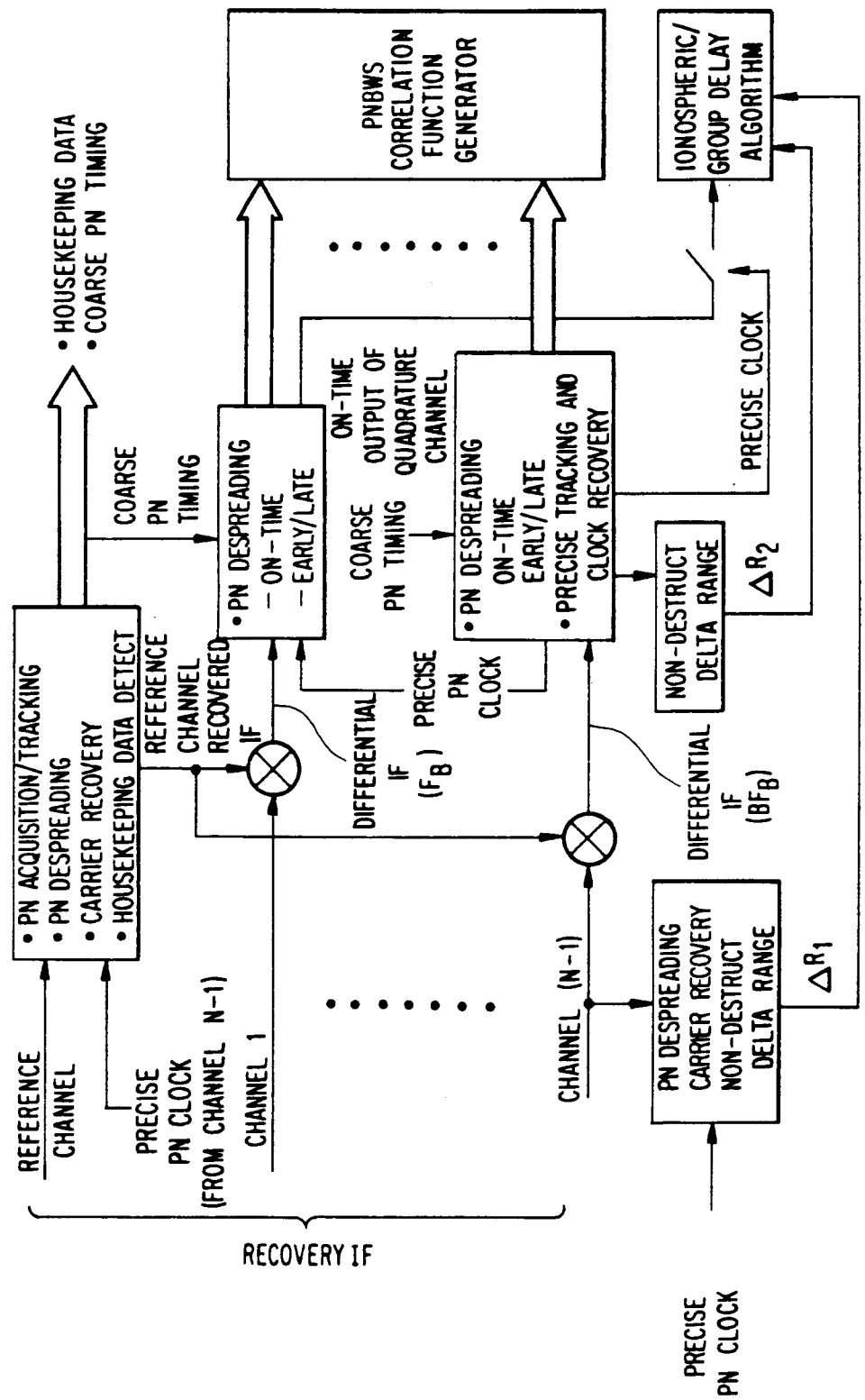
FIG. 7 is a block diagram of the signal processing with the ionospheric/group delay measurement according to the invention.
Figure 8:
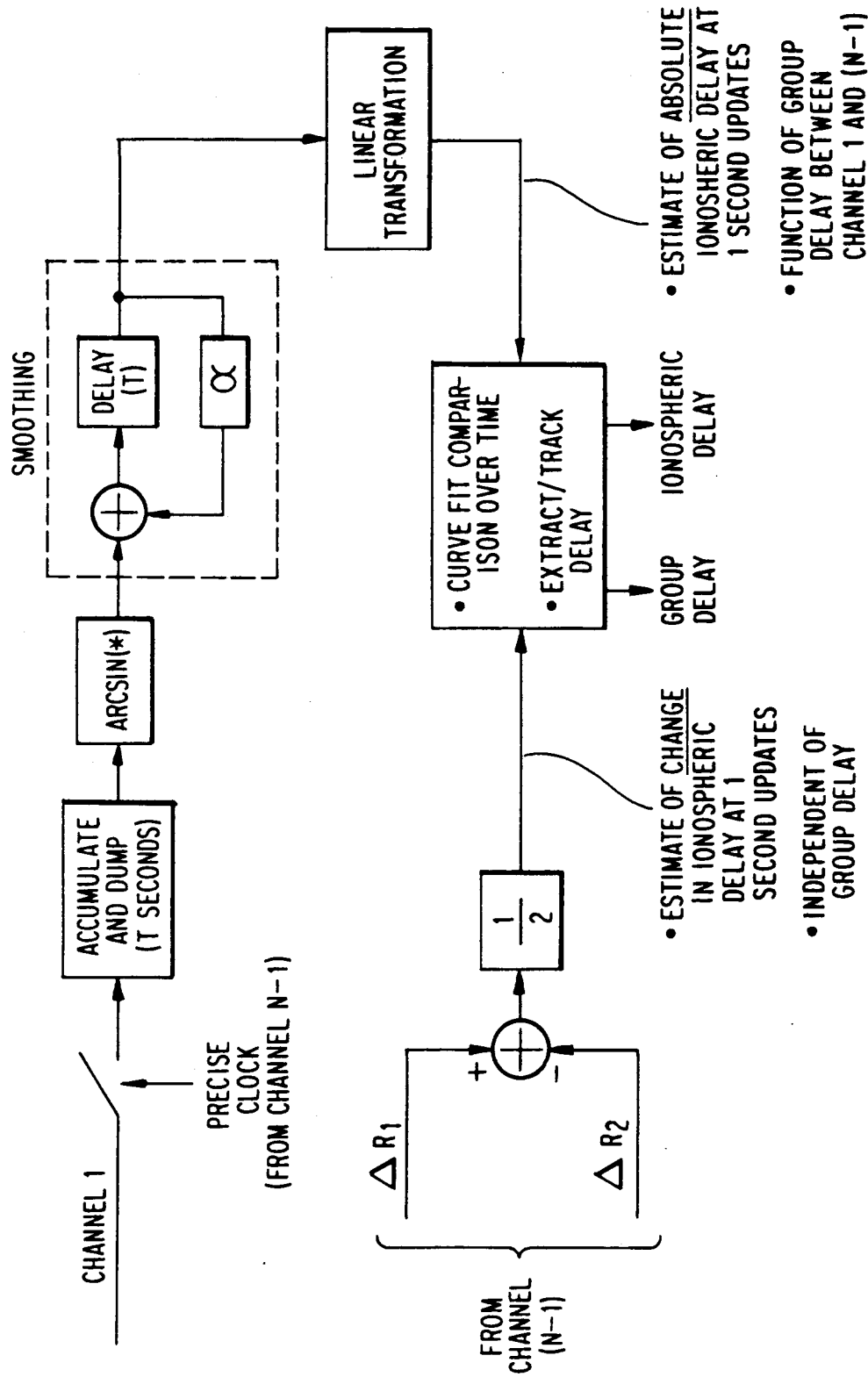
FIG. 8 illustrates the functional processing details for the joint ionospheric/group delay measurements.
Figure 9A:
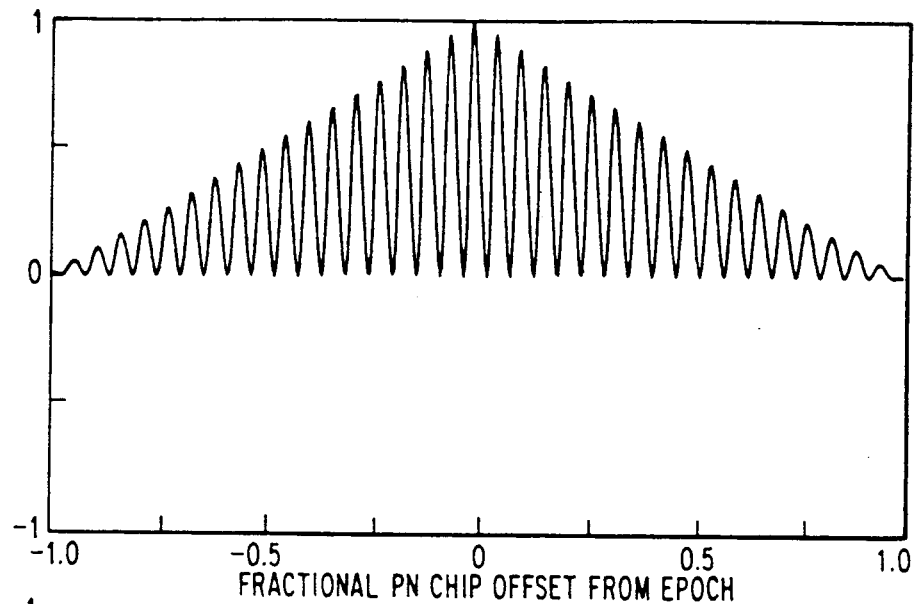
FIGS. 9a, 9b, and 9c illustrate composite correlation functions for two spectral components, three spectral components, and five spectral components, respectively.
Figure 9B:
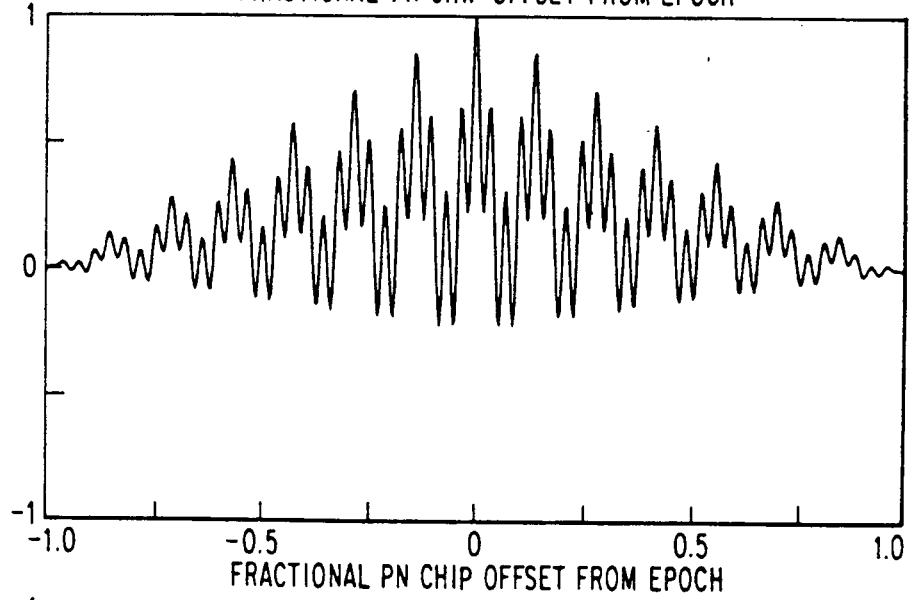
Figure 9C:
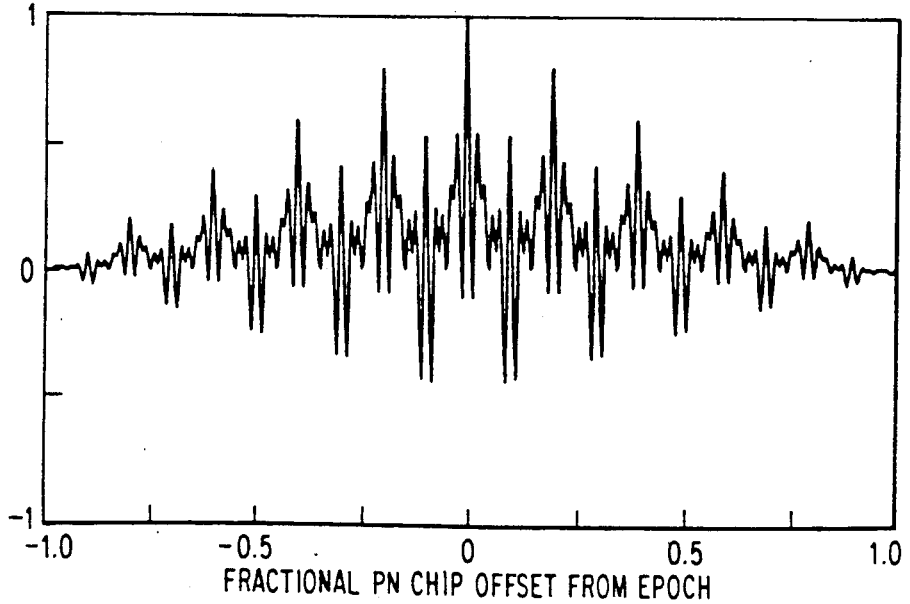

FIG. 7 illustrates the system processing with ionospheric and group delay measurement, and the circuitry illustrated in FIG. 8 illustrates the functional processing details for joint ionospheric and group delay measurements.

The signals received by each of the remote stations are distorted by the signal generation and filtering process at each master station and associated ground terminal and by additional filtering in the satellite. The composite effect is group delayed distortion which is characterized by deterministic, relative delays among the different spectral components of the pseudo noise bandwidth synthesized signal components. For pseudo noise bandwidth synthesized applications of interest in this invention, where ultra-fine time resolution is sought, even NS biases are of concern. Accordingly, this group delay distortion is accounted for or calibrated out according to the invention.

Several approaches may be used and they may be applied separately or complementarily. Space craft group delay is primarily a static hardware distortion that can be measured via pre-launch, ground-based test. Group delay of ground equipment can also be analogously monitored/measured during the normal system operations. A second calibration scheme involves more signal processing on board the satellite itself wherein the individual S-band pseudo noise bandwidth synthesized signal spectral components can be tracked, and corrections applied to force their epochs to coincide this. Finally, the master station can play a key role in monitoring the systems down link and estimating the group delay. In fact, joint ionospheric/group delay estimation is feasible given the multi-spectral nature of the pseudo noise bandwidth synthesized signal.

Radio frequency signals passing through the troposphere are delayed due to refraction. This delay is virtually independent of frequency and accordingly, each spectral component of the signal is effected identically. Because of the signal-independent nature of the tropospheric delay, there is no apparent way to resolve the delay by signal transmission and processing techniques. Instead, according to the invention, the utilization of modeling data and suitable instrumentation has been used. As indicated and discussed above, water vapor radio meters are used to reduce the tropospheric delay uncertainties to a level of less than 1 cm. Based on the above, it is concluded that the system as disclosed herein cannot perform self-calibration of tropospheric effects unless the modeling data discussed above suffices. Where ultra-fine resolution is required, some form of toropospheric calibration will be required.

ORBIT DETERMINATION PROCESS

The orbit determination (OD) is the process of estimating an orbiting space craft's projectury using a set of tracking observations. Among the various estimation methods available (e.g., multilateration, batch estimation, Kalman filtering), a technique which has proven successful is the differential correction batch estimation process. Four key functions are required for orbit determination namely, measurement pre-processing, force modeling and state propogation, measurement modeling and state estimation. FIG. 15 illustrates the batch orbit determination process and the interaction between each of the four components. Raw range measurements and calibration data are, first pre-processed and calibrated observations are performed in measurement pre-processor MPP. Observation residuals are then generated by differencing the pre-processed measured observations and their computed values from measurement modeling unit MM. The residuals are determined are various times and related to a common epoch by the state transition matrix. A "batch" correction to an a priori state vector at the epoch is then determined in the differential correction estimator DCE based on minimizing the sum of the squares of the weighted residuals. The accuracy of the epoch state estimate is limited by the dynamic model from block SPM and observation errors.

Raw range measurements consisting of pairs of start and stop time tags are calibrated and converted to engineering units acceptable for orbit determination processing by the measurement processor MPP Data calibration in the system's base line includes compensation for atmospheric refraction and systematic delay. Tropospheric and ionospheric refraction correction delays may be monitored or derived at each receiving site and their values subtracted from the raw ranges. Water vapor radio meters offer the means for accessing tropospheric delay. Currently, measurement of path delays of 6 cm wavelength signals is possible with an uncertainty of only 0.25 cm. Ionospheric delay is a coincident result of the system's processing which provides a source of accurate calibration (to within 1 NS RMS).

Systematic delays may be characterized for the tracking network values and used to modify the range measurements. Ranging time tags may require adjustment due to clock biases at the remote stations. The system for determining system time offsets has been previously discussed. After the data are corrected, they must be converted to true range measurements (start and stop time differences multiplied by the speed of light), appropriately formatted and, finally, stored in the orbit determination data base.

An important element of the orbit determination process is the requirement to propogate the satellite state vector. This requires adequate models of the forces acting on a space craft. These space craft trajectory modeling systems are known in the art and are not discussed in detail. However, it is noted that the major contributors to deviations in e satellite's nominal motion include gravitation, aerodynamic and solar radiation forces. The latter two are dependent upon the space craft configuration and attitude (mass and surface area are important parameters). Finally, the mechanism which is used in the orbit determination process to reduce the estimation to a common epoch, and to propogate the coovariance is the state transition matrix. This matrix is the solution of the equations of motion for the state correlation vector (variational equations). It enable the residuals determined at each observation time to be related to the correction vector at epoch. It is also used to propogate the epoch state error coovariance to a future time.

FIG. 12 illustrates the system's base line measurement model and lists the measured sources of observation error which have been discussed above. Time-tagged system signals originate at the master station and are relayed, via the satellite to each remote station. The received signals are time-tagged an raw range measurements formed. Observation errors are reduced by improved accuracies offered by the unique system of this invention and partially compensated for via the measurement pre-processing. Since not all error sources can be removed, and those that can are not completely, the remainder must be model. The orbit determination processor requires calculated observations corresponding to each pseudo noise bandwidth synthesized range measurement. The calculated observations are derived from state estimates and include the measurement model corrections. Residuals are formed by differencing corresponding measured and computed observations. The residuals are then used by the estimator to generate the new state estimate. A batch estimator, shown in FIG. 13, uses a set (batch) of observation data to estimate the state and selected model parameters of a specified epoch. The differential correction technique utilizes a weighted least-squares estimation process compute corrections to an a priori state estimate based on the observations. The new estimate is obtained from residuals formed by differencing measured and calculated observations. The batch estimation initialization comprises all of the computations that are required to be performed prior to the start of the iteration process. Initialization requires a specification of an a priori state estimate, measurement noise coovariance, and selection of epoch time. Each iteration or outer loop consists of a set of preliminary computations followed by the interloop residual procedure. At the completion of each outer loop, a test is made for the termination of the iterative estimation process. When convergence is achieved, a number of output computations are generally performed using the estimated state and coovariance.

TRANSMITTER CIRCUITRY

Figure 3C:
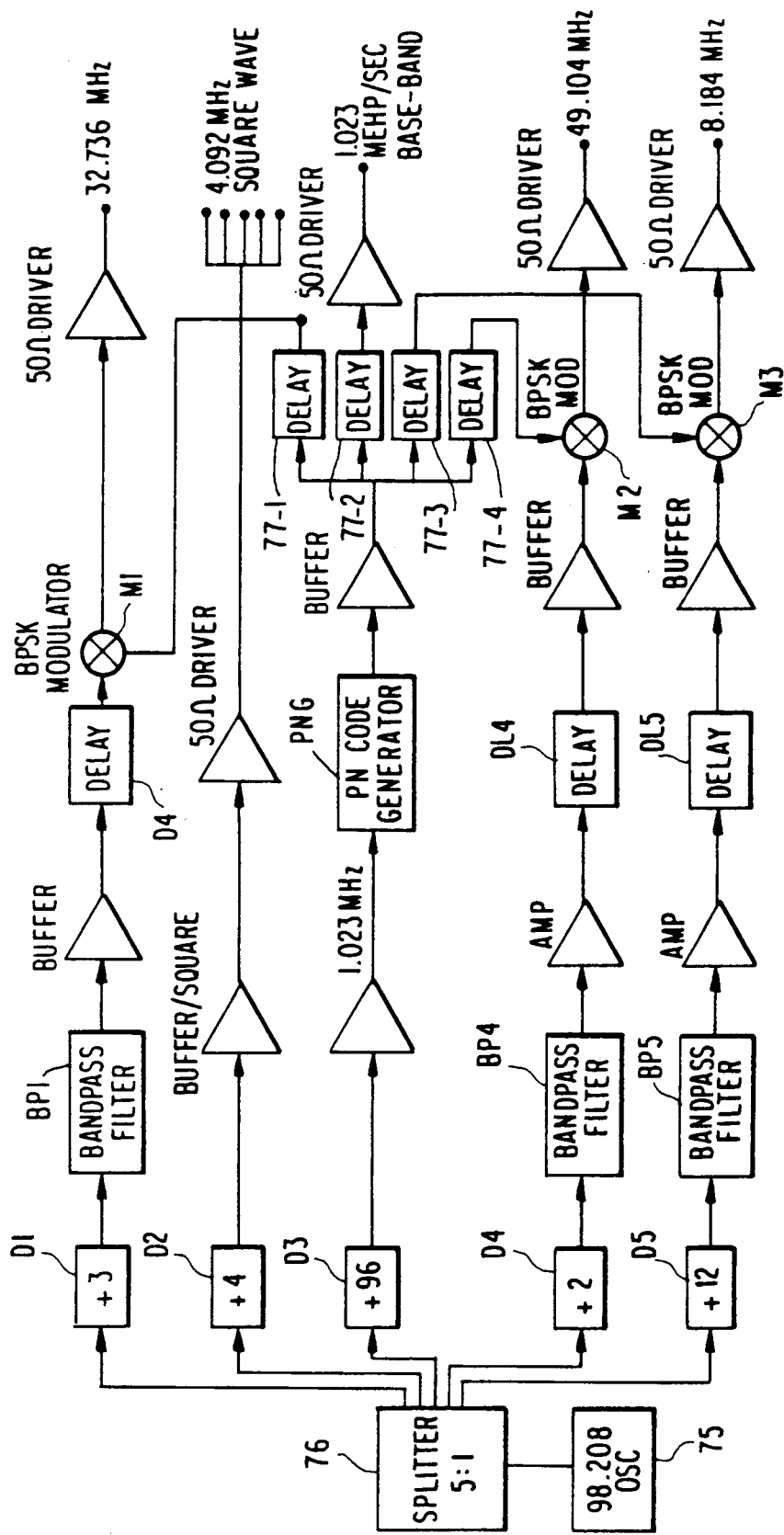
FIG. 3c is a block diagram of a system for generating the coherently different frequency components in the PNBWS signal generator.
Figure 3D:
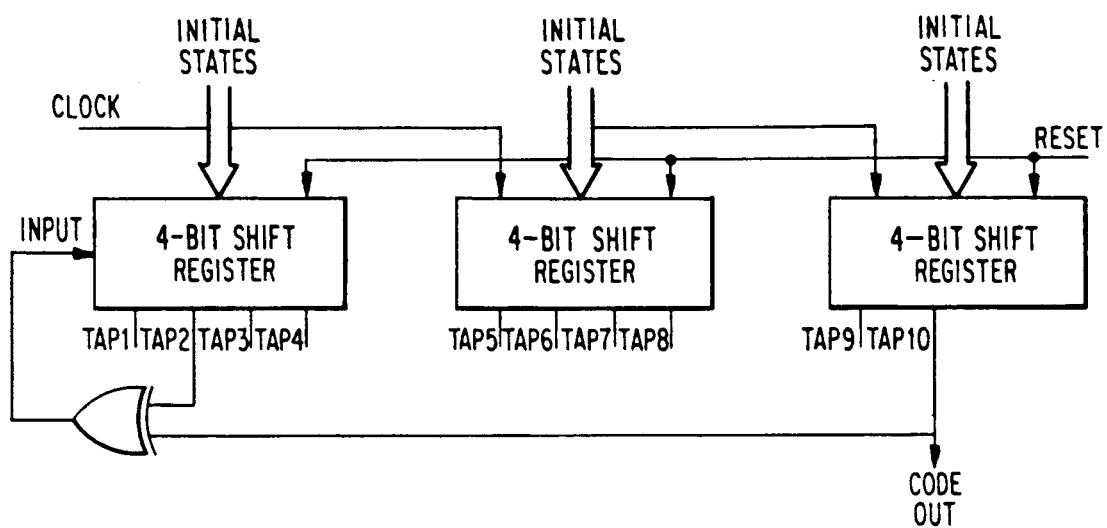
FIG. 3d is a block diagram of the PW code generator in FIG. 3c.
Figure 3E:
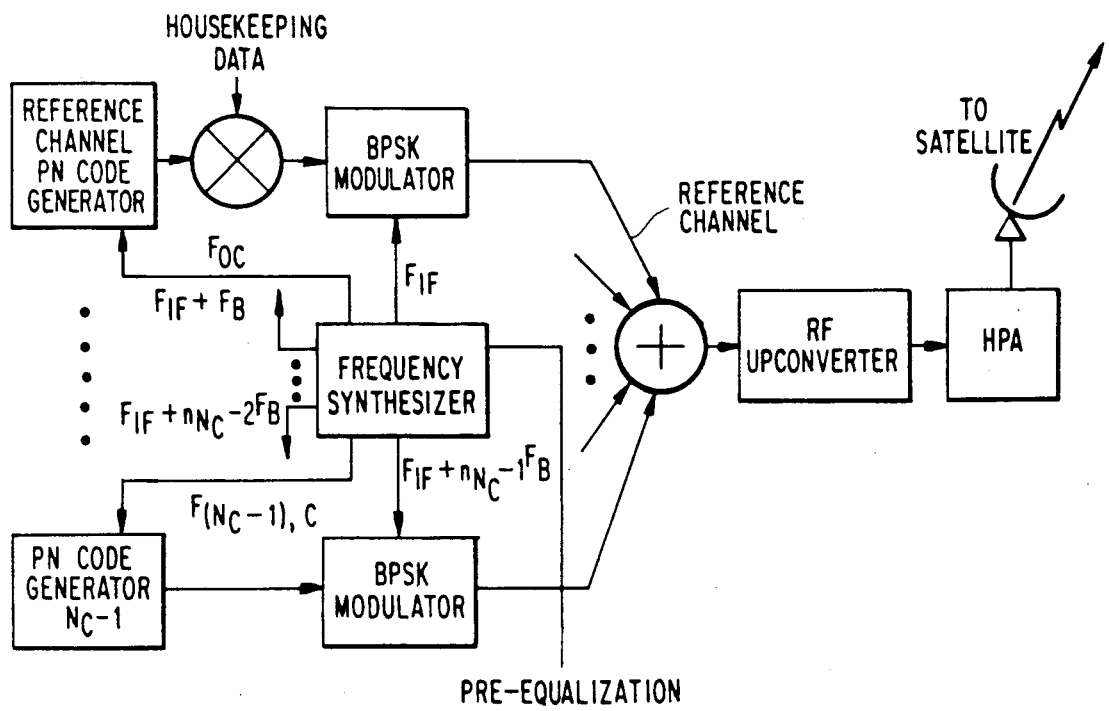
FIG. 3e is a block diagram illustrating the generator and transmission of the PNBWS signal according to the invention

Referring to FIG. 3e and FIG. 3c, a master oscillator 75 which generates a frequency of 98.208 MHz provides a stable reference for all frequency synthesis and signal generation. High speed dividers $D_1$, $D_2$, $D_3$, $D_4$, $D_5$ followed by narrow bandpass filters $BP_1$, $BP_4$, $BP_5$ are used to generated both the required signal frequencies and the PN code generator clock. In addition, this oscillator is used to generate the clock required by the receiver numeric controlled oscillator (NCO) circuitry.

The transmitter also contains a PN code generator PN6. The three IF signals are aligned to within ±2.5 nsec through the use of precise high frequency delay lines $DL_1$, $DL_4$, $DL_5$ with settable discrete delay increments of ±5 nsec. Using a similar approach, the BPSK modulation transitions and the baseband signal are also aligned to within ±2.5 nsec. Each signal is then buffered to provide a 50 ohm output to the channel emulator and receiver.

The reference oscillator 75 is a standard crystal device and provides the basis for the coherent generator of the IF signals required for the PNBWS. The 8.184 MHz IF signal is directly derived from the reference 98.208 MHz oscillator. An output of the 5:1 splitter 76 (~1 volt p-p) is passed through a divide-by-12 $D_5$ device and the output impedance matched to drive the subsequent circuitry. Following the 10.7 MHz low pass filter, the signal is capacitively coupled to an Anderson delay line $DL_5$. This delay line has tap settings with 5 nsec delay increments and is used to support the final alignment of the IF signals. BPSK modulation $M_3$, driven by the output of the PN coder PN (1.023 MChips/sec), is applied to the IF signal. The output of the BPSK modulator (~300 mv p-p) is amplified and buffered to produce a 1.4 volt p-p, 50 ohm signal. The BPSK modulator de sign utilizes a double balanced mixer (Mini Circuits SRA-1; switched through the control of TTL circuitry. This design achieves modulation switching times of less than 10 nsec with minimal amplitude variation in the resultant signal. Since information is extracted from both the signal zero crossings and peaks, amplitude control is a key requirement of the IF signal generator.

The generation of the modulated 32.736 MHz IF signal utilizes a nearly identical circuit design approach to that of the 8.184 MHz IF signal. The 98.208 MHz oscillator signal is processed through a high speed divide-by-three circuit $D_1$ buffered, and filtered through a three pole Chebychev bandpass filter $BP_1$ with a $-3$ dB bandwidth of 2 MHz. The filter output is capacitively coupled to an Anderson delay line $DL_1$. BPSK modulation and amplification then occur as previously described for the 8.184 MHz circuit.

The 49.104 MHz modulator circuit uses an approach nearly identical to those described previously. The 98.028 MHz oscillator is processed by a high-speed divide-by-two circuit $D_4$. This device operates over the range of 50 to 300 MHz and special design must be taken to provide proper matching of the input impedance. Following the division, the signal is buffered and filtered through a three pole Chebychev bandpass filter $BP_4$ with a $-3$ dB bandwidth of 2 MHz. The filter output is capacitively coupled to an Anderson tap delay line $DL_4$, BPSK modulated, and amplified as previously described.

The reference clock for PN code clock is also derived in divider $D_3$ from the master oscillator through a divide-by-24 circuit using a pair of high speed ECL dividers, following by a TTL divide-by-four circuit.

The transmitter also provides five 24.552 MHz clock signals to support the operation of the NCO (Numeric Controlled Oscillator) used in the receiver. These signals are generated in the transmitter only for convenience in this embodiment, since the reference oscillator circuitry is available. In a preferred implementation the clock would be independently derived in the PNBWS receiver.

The NCO clock is derived from the 98.208 MHz oscillator by using a high-speed ECL SP-8601 divide-by-four circuit $D_2$. This signal is filtered through a three pole Chebychev bandpass filter with a $-3$ dB bandwidth of $\pm 1$ MHz. The resultant sine wave output is squared and buffered through 50 ohm drivers for use in the receiver signal processor hardware.

The PN code generation circuit is identical to that used in the receiver and as shown in FIG. 3d. The PN code sequence 1023 bits in length) is generated using 3 four bit shift registers $SR_1$, $SR_2$ and $SR_3$ with feedback taps at bits 2 and 10. In order to support the digital demodulation approach used by the PNBWS receiver, the signals output from the transmitter must be time aligned with each other within $\pm 2.5$ nsec. Phase alignment is achieved through the use of wide bandwidth Anderson tap delay lines with step increments of 5 nsec. A manual alignment procedure can be used to determine the proper tap settings which are permanently affixed in the hardware to occur within $\pm 2.5$ nsec of the transition.

Thus, at the output of the transmitter, the three IF signals are phase aligned to within $\pm 2.5$ nsec and the data transitions for the BPSK modulation and the baseband PN code are aligned to within $\pm 2.5$ nsec.

RECEIVER CIRCUITRY

Figure 10:
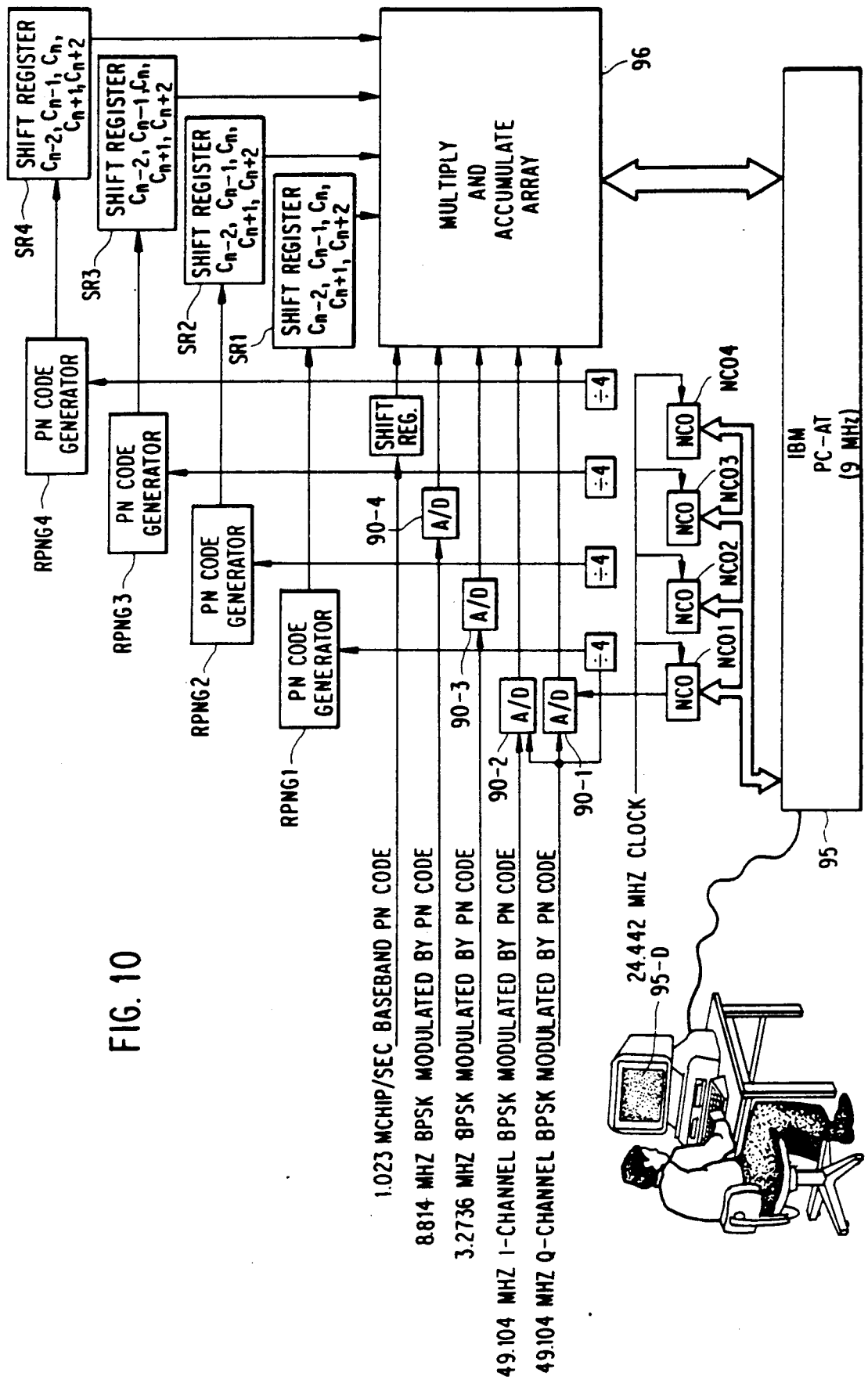
FIG. 10 illustrates the pseudo-noise bandwidth synthesis spectral receiver, used herein.

A functional diagram of a PNBWS receiver incorporated in the invention is shown in FIG. 10. The receiver is comprised of five nearly identical hardware channels which provide the PN despreading required to support the PNBWs algorithm processing in a conventional computer microprocessor 95. Four boards process the IF signals and the fifth processes the baseband PN code data. (For this explanation, the baseband channel is assumed to be a perfect replica of the transmitter PN code, i.e., no errors are added to this channel.)

On each board the incoming signals are sampled and their amplitudes digitized to a two's complement value by a 6-bit A/D converter 90-1, 90-2, 90-3, 90-4. Simultaneously, a PN code generator RPNG1, RPNG2, RPNG3, RPNG4 on each board produces the appropriate chip value. The PN acquisition process of the actual receiver is not illustrated herein, but instead, upon initialization of the hardware, forces synchronization to occur between the five PN code generators RPNG1, RPNG2, RPNG3, RPNG4 used in the receiver and the PN code generator PN6 used by the transmitter.

A correlation process is then performed during which the A/D samples and the code values are multiplied together and their results accumulated in multiply and accumulate array 96 over one cycle of the PN code (i.e., 1023 chips) or once each millisecond. The precise A/D sample timing is then adjusted based upon these measurements as processed by the microprocessor-controlled tracking loops for each board.

A/D sample and PN chip timing is generated by the numerically controlled oscillator $NCO_1$, $NCO_2$, $NCO_3$, $NCO_4$ located on each channel board. The NCO output frequency is derived from a 24.552 MHz clock supplied by the transmitter (use of a 24 MHz transmitter clock is justified since baseline requirements include clock synchronization between the transmitter and receiver) and the tracking loop microprocessor information ($\Delta\Phi$). This relationship is defined by the equation:

$$f_{NCO} = \frac{\text{32-bit Integer}}{2^{32}} \cdot (NCO\ \text{Clock})$$

A value of 2AAAAAAB H is required to generate the nominal operating frequency of $f_{NCO} \approx 4.092$ MHz.

The processor collects all the accumulation results each millisecond, generates tracking information, and updates the A/D sampling point through updates to the NCO. The processing load on the computer 95 does not permit direct output of real-time performance data to its own display 95D. Thus, status and performance information may be transferred to a second PC via a separate bus for real-time display 95D.

As noted above, each of receiver channel signals is initially processed by analog-to-digital conversion circuitry which generates the soft-decision digital data input for the PN correlation accumulator hardware. Since the A/D circuitry operates directly on the IF signals (except for the baseband channel which utilizes a shift register to capture samples), its design must support an input frequency range up to 50 MHz.

Use of commercially fabricated and tested A/D hardware significantly reduce both the development effort and development risk for this circuitry. The A/D board provides the capability to generate 6-bit samples at a 100 MSample/sec rate. While the PNBWS sample rate was held at 4.092 MSamples/sec, full advantage was taken of the 50 MHz bandwidth to these devices. Since the A/D board uses ECL logic to achieve its high sampling speeds, ECL-TTL interface conversion hardware was developed to interface with the rest of the digital signal processing board.

Each channel (except the 49 MHz Q-channel; of the digital signal processing hardware provides five separate estimates for the despread signal corresponding to the estimated correlation tracking times of:
On-time,
±¼ chip late,
±½ chip late.
(Note that the 49 MHz Q-channel only generates the on-time estimate which is used for ambiguity resolution of the 49 MHz signal.)

The Multiply/Accumulate chips (MAC) 96 are used to generate the correlation between the PN code generated in the receiver and the soft-decision estimate of the received PN code. The two inputs to each chip, hard-decision (±1) internal PN generator output and the soft-decision (±31 to −32) 6-bit A/D output are multiplied and the result accumulated for one complete PN code period. At the completion of each 1 msec accumulation interval the 16-bit result from each MAC (the most significant bits of the 19 bit accumulation register) is transferred to the microprocessor as input to the tracking algorithms. A constant value is included in the transfer and is used by the processor as an indication of new data. Components of the transfer are:

| | | |
|---|---|---|
| 8 MHz | −5 times × 2 bytes (16-bit result) = | 10 bytes |
| 32 MHz | −5 times × 2 bytes (16-bit result) = | 10 bytes |
| 49 MHz (I) | −5 times × 2 bytes (16-bit result) = | 10 bytes |
| 49 MHz (Q) | −1 time × 2 bytes (16-bit result) = | 2 bytes |
| Baseband | −5 times × 2 bytes (16-bit result) = | 10 bytes |
| New Data Flag | −1 time × 2 bytes (16-bit result) = | 2 bytes |
| | | 44 bytes |

Support and interface logic is required to operate the MACs and to provide appropriate timing control, and to facilitate transfer of the data to the microprocessor. To support the continuous real-time data processing requirements for the PN correlation accumulation, the entire MAC circuitry operates continuously and independently, i.e., without control from the microprocessor.

Master station precise clock reconstruction at each remote station provides highly accurate clock synchronization at all remote stations is achieved using a self-contained frequency synchronization and locking to the master station precise lock standard.

An important characteristic of the PNBWs concept is its ability for highly precise time discrimination. A high resolution numeric controlled oscillator (NCO) provides this capability for precise control of the A/D sampling time under the management of a microprocessor feedback loop.

Figure 11:
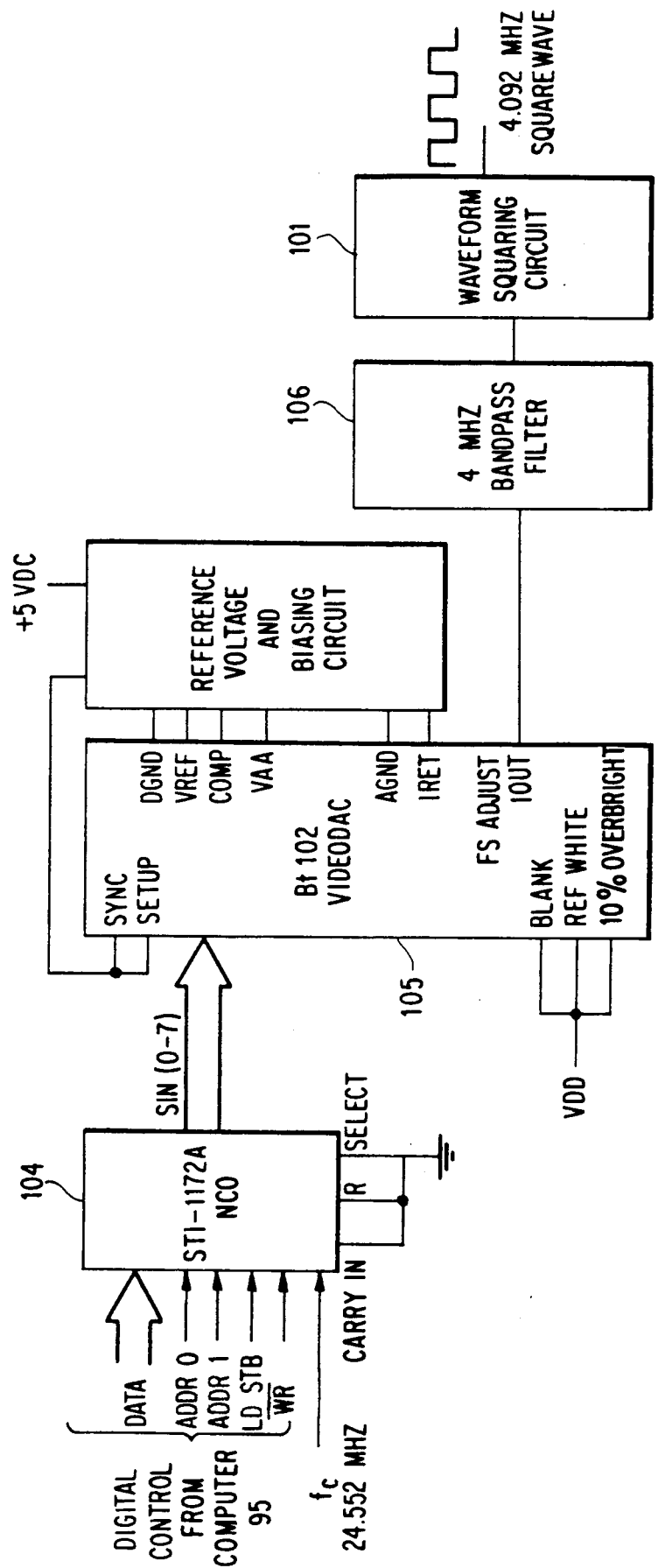
FIG. 11 is a block diagram of the numerically controlled oscillator (NCO) as used herein.

FIG. 11 illustrates the application of the NCO and its supporting circuitry according to this invention. Digital output from the NCO 104 is transferred to the Digital-to-Analog (DAC) converter 105. The resulting analog signal is low-pass filtered 106 to remove the 24.552 MHz sampling signal residual and then is squared 107 to derive the 4.092 MHz sampling clock used by the A/D converters 90-1, 90-2, 90-3, 90-4.

In order to adjust and maintain the timing of the five channels relative to each other, a single 24.552 MHz clock is used to feed all the NCOs. The frequency of the NCO 104 is controlled by the microprocessor 95 through an 8-bit digital interface port in the NCO. Upon initialization, the frequency of each NCO is set by microprocessor to 4.092 MHz. Changes in NCO timing. i.e., phase offsets, are achieved by changing the NCO frequency over a fixed time interval then returning to the original frequency value. The resultant phase is computed by the relationship:

$$\Delta\Phi = 2\pi \cdot \Delta f \cdot \Delta t.$$

In a typical application, the NCO is controlled by a dedicated micro-controller chip. In this configuration the micro-controller has sufficient speed to send the full four (4) bytes of frequency control information to the NCO, wait the required time interval (using its own internal timers to control the duration) and to then and the original frequency information to reset the NCO. The computer 95 used to control the PNBWS hardware is actually multiplexed over many functions, e.g., MAC data processing, control of five NCOs, output data presentation, etc., and cannot support a dedicated NCO control operation similar to that described above.

To simplify the interface between the microprocessor and the NCO, dedicated support circuitry was designed to provide a fixed time interval of $\Delta t = 3.095$ μsec. This reduces the real-time data transfers required to be supported by computer 95 from eight bytes per NCO update cycle to only a single byte. When a phase bump is desired, the microprocessor issues a change to the next to the most significant byte of the NCO input. This operation is illustrated by the following:

Nominal NCO frequency setting to achieve a 4.092 MHz clock: 2A AA AA AB

Maximum forward phase bump, i.e., frequency setting is: 2A FF AA AB: 35.49 degrees, Maximum forward phase bump, i.e., frequency setting is: 2A 00 AA AB; 70.91 degrees.

Supporting hardware with each NCO retains the nominal frequency value and resets the NCO back to the original frequency when the 3.095 μsec interval expires.

A separate PN code generator (as shown in FIG. 3d) is used for each channel of the PNBWS receiver. The PN code sequence (1023 bits in length) is generated using three four bit shift registers with feedback taps at bits 2 and 10. The initial value of the code is fixed by the hardware design. All PN code generators are simultaneously started by a single control line from the PC-AT microprocessor.

With reference to FIG. 1, in addition to the master and remote station ground terminals, a low earth orbit space craft LEO can be provided with on-board processing devices OB similar to that provided at the ground stations for processing the PNBWS signals to thereby enhance navigation accuracy and orbit determination capability down to about 10 meters.

Finally, users which are not equipped with the PNBWS system and equipment disclosed herein can still access the base line navigation beacon (component $C_n$ in FIG. 2a) only, with no loss in performance relative to the current advanced tracking and data relay systems.

While there has been shown and described the preferred embodiments of the invention, it will be appreciated that numerous modifications and adaptations of the invention will be readily apparent to those skilled in the art and it is intended to encompass all such modifications and adaptations as may come within the spirit and scope of the claims appended hereto.

What is claimed is:

1. A satellite ranging and timing system in which a master station on earth transmits signals to an earth orbiting communication satellite and a plurality of remote stations within radio view of said satellite and communicate with each other and said master station via said communications satellite, said ranging and timing system including, means at said master station for generating and transmitting a wide bandwidth pseudo-noise signal, said wide bandwidth pseudo-noise signal being comprised of a plurality of disjoint narrow-band spectral components, said master station including a master system clock for controlling the generation and transmission of said wide bandwidth pseudo-noise signal, and means for determining from return of components of said pseudo-noise signal from said earth orbiting communication satellite orbit data of said satellite and transmitting said orbit data to all other stations via said satellite, means at each of said plurality of remote stations for receiving said wide-band pseudo-noise signal and deriving data including range information to said communications satellite, means at each of said stations for transmitting said range information to said master station, and means at said master station for receiving said wideband pseudo-noise signal and deriving data including range information for said stations from different ones of said disjoint narrow-band spectral components and determining orbit data of said communication satellite and provide real time satellite position data.

2. A satellite ranging and timing system in which a master station on earth transmits signals to an earth orbiting communication satellite and a plurality of remote stations within radio view of said satellite communicate with each other and said master station via said communications satellite, said ranging and timing system including, means at said master station for generating and transmitting a wide bandwidth pseudo-noise signal, said wide bandwidth pseudo-noise signal being comprised of a plurality of disjoint narrow-band spectral components, and means at each of said plurality of remote stations for receiving said wide-band pseudo-noise signal and deriving data including range information to said communications satellite, means at each of said stations for transmitting said range information to said master station, means at said master station for receiving said range information from said remote stations, said master station including means providing a calibration signal, and means at said master station for determining the orbit data of said satellite from said range information and said calibration information and producing real time satellite position data at each of said stations.

3. The satellite ranging and timing system defined in claim 2 wherein, said master station includes a master system clock for controlling the generation and transmission of said wide bandwidth pseudo-noise signal, and means for determining from return of components of said pseudo-noise signal from said earth orbiting communications satellite orbit data of said satellite and transmitting said orbit data to all other stations via said satellite.

4. A satellite ranging and timing system in which a master station on earth transmits pseudo-noise signals to an earth orbiting communications satellite and a plurality of remote station within radio view of said satellite to communicate with each other and said master station via said communication satellite, said ranging and timing system including:

means at said master station for generating and transmitting a wide-band pseudo-noise signal, said wide-band pseudo-noise signal being comprised of a plurality of mutually coherent disjoint, narrow-band, spectral components which are frequency division multiplexed over said wide-band width, and means at said master station for receiving said wide-band pseudo-noise signal, demultiplexing same and deriving data including range information for said stations from different ones of said disjoint narrow-band spectral components.

5. A satellite ranging and timing system defined in claim 4 wherein at least one of said plurality of remote stations includes means for receiving and demultiplexing said wide-band pseudo-noise signal and deriving data including range information for that station from said disjoint narrow-band spectral components of said frequency division multiplexed wide-band signal.

* * * * *